US010980061B2

(12) United States Patent
Sugaya et al.

(10) Patent No.: US 10,980,061 B2
(45) Date of Patent: Apr. 13, 2021

(54) INFORMATION PROCESSING APPARATUS, COMMUNICATION SYSTEM, INFORMATION PROCESSING METHOD, AND PROGRAM

(71) Applicant: SONY CORPORATION, Tokyo (JP)

(72) Inventors: Shigeru Sugaya, Kanagawa (JP); Yusuke Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/777,701

(22) PCT Filed: Nov. 9, 2016

(86) PCT No.: PCT/JP2016/083162
§ 371 (c)(1),
(2) Date: May 21, 2018

(87) PCT Pub. No.: WO2017/119184
PCT Pub. Date: Jul. 13, 2017

(65) Prior Publication Data
US 2018/0352576 A1 Dec. 6, 2018

(30) Foreign Application Priority Data
Jan. 6, 2016 (JP) .............................. JP2016-000783

(51) Int. Cl.
*H04W 74/08* (2009.01)
*H04W 72/04* (2009.01)
(Continued)

(52) U.S. Cl.
CPC ... *H04W 74/0816* (2013.01); *H04W 72/0446* (2013.01); *H04W 74/04* (2013.01);
(Continued)

(58) Field of Classification Search
CPC ............. H04W 74/0816; H04W 74/04; H04W 72/0446; H04W 16/14; H04W 84/12; Y02D 70/00; Y02D 70/10
See application file for complete search history.

(56) References Cited

U.S. PATENT DOCUMENTS

2003/0123405 A1* 7/2003 del Prado ............. H04W 16/14
370/331
2006/0114867 A1* 6/2006 Du ....................... H04W 74/002
370/338
(Continued)

FOREIGN PATENT DOCUMENTS

EP        3 300 445 A1    3/2018
JP        2004-525586 A   8/2004
(Continued)

OTHER PUBLICATIONS

Evgeny Khorov, et al., "Multiple NAVs for Spatial Reuse," IEEE 802.11-15/1348, Nov. 9, 2015, 11 Pages (Year: 2015).*
(Continued)

Primary Examiner — Thinh D Tran
(74) Attorney, Agent, or Firm — Xsensus LLP

(57) ABSTRACT

Wireless communication is appropriately performed.
An information processing apparatus is an information processing apparatus including a management unit. The management unit included in the information processing apparatus manages a transmission suppression time period set in a network including the information processing apparatus. Along with the management, the management unit also manages a transmission suppression time period set in each of other networks, the other networks not including the information processing apparatus and transmitting radio waves reaching at least the information processing appara-
(Continued)

tus, the management unit managing the transmission suppression time period for each of the other networks.

20 Claims, 11 Drawing Sheets

(51) Int. Cl.
   *H04W 74/04* (2009.01)
   *H04W 84/12* (2009.01)
   *H04W 16/14* (2009.01)

(52) U.S. Cl.
   CPC ............ *H04W 16/14* (2013.01); *H04W 84/12* (2013.01); *Y02D 30/70* (2020.08)

(56) References Cited

U.S. PATENT DOCUMENTS

| | | | |
|---|---|---|---|
| 2014/0293800 A1* | 10/2014 | Xie ................. | H04W 40/246 370/252 |
| 2015/0156794 A1* | 6/2015 | Kwon ............... | H04W 72/1231 370/329 |
| 2015/0296370 A1* | 10/2015 | Kim .................. | H04W 24/08 370/338 |
| 2017/0064739 A1* | 3/2017 | Hedayat ............ | H04L 5/0025 |
| 2017/0163322 A1* | 6/2017 | Li ..................... | H04B 7/0456 |
| 2017/0295560 A1* | 10/2017 | Kim .................. | H04L 5/0055 |

FOREIGN PATENT DOCUMENTS

| | | |
|---|---|---|
| JP | 2016-500223 A | 1/2016 |
| WO | 2015/050311 A1 | 4/2015 |

OTHER PUBLICATIONS

Hedayat et al., "Methods for Spatial Reuse with TXOP types Handling", U.S. Appl. No. 62/254,131, filed Nov. 11, 2015 (Year: 2015).*
Hedayat et al., "NAV Types", U.S. Appl. No. 62/210,420, filed Aug. 26, 2015 (Year: 2015).*
Kim et al., "TXOP Truncation Method", U.S. Appl. No. 62/217,795, filed Sep. 11, 2015 (Year: 2015).*
International Search Report dated Jan. 24, 2017 in PCT/JP2016/083162 filed Nov. 9, 2016.
Evgeny Khorov, et al., "Multiple NAVs for Spatial Reuse," IEEE 802.11-15/1348, Nov. 9, 2015, 11 Pages.
Jeongki Kim, et al., "MU TXOP Truncation," IEEE 802.11-15/1067r0, Sep. 13, 2015, 16 Pages.
Extended European Search Report dated Nov. 16, 2018 in European Application No. 16883684.9-1215.
Yue Fang, et al, "A Two-level Carrier Sensing Mechanism for Overlapping BSS Problem in WLAN", Local and Metropolitan Area Networks, Sep. 18, 2005, pp. 1-6.

* cited by examiner

EXAMPLE OF FORMAT OF RTS FRAME a

EXAMPLE OF FORMAT OF CTS FRAME b

EXAMPLE OF FORMAT OF ACK FRAME c

EXAMPLE OF FORMAT OF PS-POLL FRAME d

EXAMPLE OF FORMAT OF CF-End FRAME e

EXAMPLE OF FORMAT OF CF-End + CF-ACK FRAME f

EXAMPLE OF SETTING NAV BASED ON RTS FRAME AND CTS FRAME a

EXAMPLE OF SETTING AND CANCELLING NAV BASED ON CTS-to-Self FRAME b

EXAMPLE OF SETTING AND CANCELLING NAV BASED ON CTS-to-Self FRAME c a b

FIG. 6

ONAV INFORMATION MANAGEMENT TABLE

| FRAME TYPE | RA | TA | RECEPTION TIME | Duration | PROVISIONAL REGISTRATION | RECEPTION SIGNAL STRENGTH (RSSI) |
|---|---|---|---|---|---|---|
| CTS | 1001 | 1002 | 00:00 | D1 | 0 | R1(dBm) |
| CTS | 2001 | 2003 | 00:00 | D2 | 0 | R2(dBm) |
| RTS | 3005 | 3004 | 00:00 | D3 | 1 | R3(dBm) |
| ⋮ | ⋮ | ⋮ | ⋮ | ⋮ | ⋮ | ⋮ |

501, 502, 503, 504, 505, 506, 507 a

NAV INFORMATION MANAGEMENT TABLE

| RECEPTION TIME | Duration |
|---|---|
| 00:00 | D4 |

511, 512 b

EXAMPLE OF SETTING AND CANCELLING ONAVS BASED ON MANAGEMENT OF EACH OF A PLURALITY OF OBSSS a

EXAMPLE OF SETTING AND CANCELLING ONAVS BASED ON MANAGEMENT OF EACH OF A PLURALITY OF OBSSS b

INFORMATION PROCESSING APPARATUS, COMMUNICATION SYSTEM, INFORMATION PROCESSING METHOD, AND PROGRAM

TECHNICAL FIELD

The present technique relates to an information processing apparatus. More specifically, the present technique relates to an information processing apparatus, a communication system, an information processing method, and a program causing a computer to execute the method, for using wireless communication to exchange data.

BACKGROUND ART

In the past, there has been a wireless communication technique of using wireless communication to exchange data. For example, a communication method of using a wireless LAN (Local Area Network) to exchange data between information processing apparatuses is proposed.

In addition, a wireless LAN communication standard defines a method of setting an NAV (Network Allocation Vector) to carry out virtual carrier sense to prevent interference of a reception operation of a device that is receiving data.

In addition, the wireless LAN communication standard is brushed up in recent years in order to improve the throughput. For example, a method is proposed, in which the transmission power is adjusted for each of individual communications to adjust the level of the carrier sense to thereby spatially reuse different communications without affecting the communications.

Here, only the virtual carrier sense in one BSS (Basic Service Set) is expected in the wireless LAN communication standard. Therefore, the standard defines that the longest value can be held in the case of setting the NAV.

However, there may also be another BSS (OBSS (Overlapping Basic Service Set)) overlapping with the BSS including the apparatus. Therefore, a technique of constructing a mechanism for coexistence with the OBSS is proposed. For example, in a proposed technique, the NAV of the BSS including the apparatus and an overlap NAV (ONAV) of the OBSS are combined and used (for example, see PTL 1).

CITATION LIST

Patent Literature

[PTL 1]
JP 2004-525586A

SUMMARY

Technical Problem

In the related technique described above, the NAV of the OBSS can be used as an ONAV. Here, there may be a plurality of OBSSs. In such a case, it is important to consider the plurality of OBSSs to improve the throughput for appropriate wireless communication.

The present technique has been made in view of the circumstances, and an object of the present technique is to appropriately perform wireless communication.

Solution to Problem

The present technique has been made to solve the problem described above, and a first aspect of the present technique provides an information processing apparatus, an information processing method of the information processing apparatus, and a program causing a computer to execute the method, the information processing apparatus including a management unit that manages a transmission suppression time period set in a network including the information processing apparatus and that manages a transmission suppression time period set in each of other networks, the other networks not including the information processing apparatus and transmitting radio waves reaching at least the information processing apparatus, the management unit managing the transmission suppression time period for each of the other networks. This produces an effect of managing the transmission suppression time period set in the network including the information processing apparatus and managing, for each of the other networks, the transmission suppression time period set in each of the other networks.

Furthermore, in the first aspect, the management unit may set the transmission suppression time period of each of the other networks on a basis of a control signal received from another information processing apparatus belonging to one of the other networks. This produces an effect of setting the transmission suppression time period of each of the other networks based on the control signal received from another information processing apparatus belonging to one of the other networks.

Furthermore, in the first aspect, the management unit may set the transmission suppression time period of one of the other networks on a basis of a value of Duration in a control signal received from another information processing apparatus belonging to the one of the other networks. This produces an effect of setting the transmission suppression time period of one of the other networks based on the value of Duration in the control signal received from another information processing apparatus belonging to the one of the other networks.

Furthermore, in the first aspect, in a case where a control signal received from another information processing apparatus belonging to one of the other networks is a CTS (Clear to Send) frame, the management unit may set the transmission suppression time period of the one of the other networks as a management target. This produces an effect of setting the transmission suppression time period of one of the other networks as a management target in the case where the control signal received from another information processing apparatus belonging to the one of the other networks is a CTS frame.

Furthermore, in the first aspect, in a case where a control signal received from another information processing apparatus belonging to one of the other networks is a CF-END (Contention Free End) frame, the management unit may cancel the transmission suppression time period of the one of the other networks corresponding to address information in the CF-END frame. This produces an effect of cancelling the transmission suppression time period of one of the other networks corresponding to the address information in the CF-END frame in the case where the control signal received from another information processing apparatus belonging to the one of the other networks is a CF-END frame.

Furthermore, in the first aspect, in a case where a control signal received from another information processing apparatus belonging to the network is an RTS (Request to Send) frame, the management unit may set the transmission suppression time period of the network on a basis of a value of Duration in the RTS frame. This produces an effect of setting the transmission suppression time period of the network based on the value of Duration in the RTS frame in the case where the control signal received from another information processing apparatus belonging to the network is an RTS frame.

Furthermore, in the first aspect, an access control unit may be further included, the access control unit performing control not to transmit a signal to a wireless transmission path until all the transmission suppression time period of the network and the transmission suppression time period of each of the other networks as management targets of the management unit are cancelled. This produces an effect of performing the control not to transmit a signal to the wireless transmission path until all the transmission suppression time period of the network and the transmission suppression time period of each of the other networks as management targets of the management unit are cancelled.

Furthermore, in the first aspect, the management unit may change details of management of the transmission suppression time period on a basis of a type of control signal received from another information processing apparatus belonging to one of the other networks. This produces an effect of changing the details of management of the transmission suppression time period based on the type of control signal received from another information processing apparatus belonging to one of the other networks.

Furthermore, in the first aspect, the management unit may manage, for each of the other networks, transmission suppression time periods set in a plurality of the other networks. This produces an effect of managing, for each of the other networks, the transmission suppression time periods set in a plurality of the other networks.

Furthermore, in the first aspect, in a case where a control signal received from an access point belonging to the network is a CTS frame, the management unit may figure out that data is to be transmitted from the access point in the network. This produces an effect of figuring out that data is to be transmitted in the network in the case where the control signal received from the access point belonging to the network is a CTS frame.

Furthermore, in the first aspect, in a case where a control signal received from an access point belonging to the network is a CF-END frame, the management unit may figure out that data is not to be transmitted in the network. This produces an effect of figuring out that data is not to be transmitted in the network in the case where the control signal received from the access point belonging to the network is a CF-END frame.

Furthermore, a second aspect of the present technique provides a communication system, an information processing method of the communication system, and a program causing a computer to execute the method, the communication system including a first information processing apparatus and a second information processing apparatus, the first information processing apparatus transmitting a control signal for setting a transmission suppression time period in a network including both the first information processing apparatus and the second information processing apparatus in a case where data is to be transmitted in the network, the second information processing apparatus including a management unit that manages the transmission suppression time period set in the network on a basis of the control signal and that manages a transmission suppression time period set in each of other networks, the other networks not including the first information processing apparatus or the second information processing apparatus and transmitting radio waves reaching at least the second information processing apparatus, the management unit managing the transmission suppression time period for each of the other networks. This produces an effect that the first information processing apparatus transmits the control signal for setting the transmission suppression time period in the network including both the first information processing apparatus and the second information processing apparatus in the case where data is to be transmitted in the network, and the second information processing apparatus manages the transmission suppression time period set in the network on a basis of the control signal and manages, for each of the other networks, the transmission suppression time period set in each of the other networks.

Advantageous Effect of Invention

According to the present technique, an excellent advantageous effect of appropriately performing wireless communication can be attained. Note that the advantageous effect described here may not be limited, and the advantageous effect may be any of the advantageous effects described in the present disclosure.

BRIEF DESCRIPTION OF DRAWINGS

FIG. 6 depicts an example of managing the NAV and the ONAV by an NAV and ONAV management unit 212 according to the embodiment of the present technique.

DESCRIPTION OF EMBODIMENT

Hereinafter, a mode for carrying out the present technique (hereinafter, referred to as embodiment) will be described. The embodiment will be described in the following order.

1. Embodiment (Example of OBSS-Based Management of ONAVs Set in OBSSs Along with NAV Set in BSS)

2. Application Example

1. Embodiment

[Configuration Example of Communication System]

Figure 1:
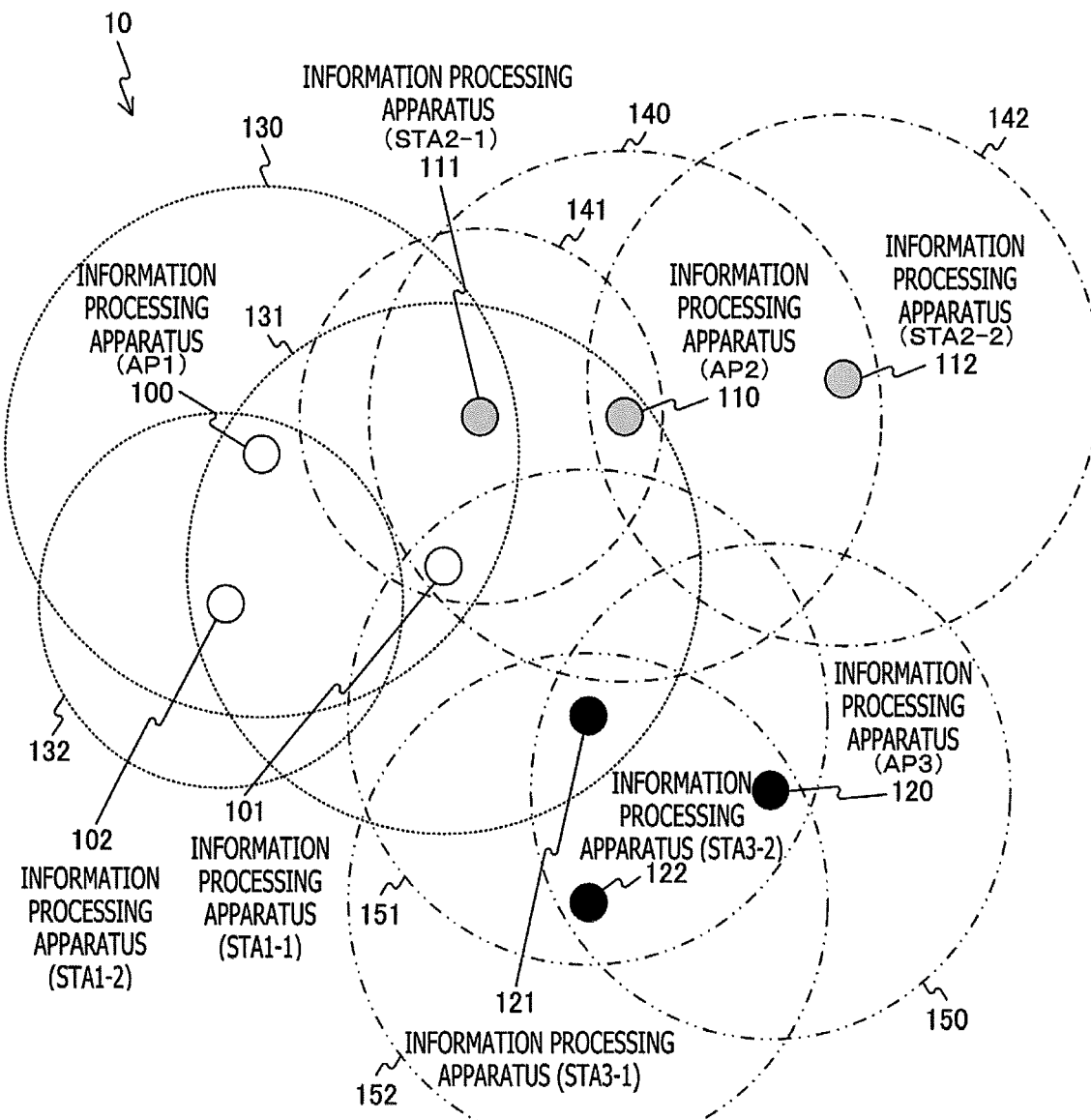
FIG. 1 depicts an example of a system configuration of a communication system 10 according to an embodiment of the present technique.

FIG. 1 depicts an example of a system configuration of a communication system 10 according to the embodiment of the present technique. Specifically, FIG. 1 schematically illustrates a situation of overlapped BSSs (Basic Service Sets).

The communication system 10 is a wireless network including an information processing apparatus (AP1) 100, an information processing apparatus (STA1-1) 101, an information processing apparatus (STA1-2) 102, an information processing apparatus (AP2) 110, an information processing apparatus (STA2-1) 111, an information processing apparatus (STA2-2) 112, an information processing apparatus (AP3) 120, an information processing apparatus (STA3-1) 121, and an information processing apparatus (STA3-2) 122. Note that in FIG. 1, a circle of a solid line indicates each information processing apparatus (AP, STA). Furthermore, wave reaching ranges 130 to 132, 140 to 142, and 150 to 152 of the information processing apparatuses (AP, STA) are indicated by circles of dotted lines around the corresponding information processing apparatuses (AP, STA).

For example, each information processing apparatus (AP, STA) included in the communication system 10 can be a fixed or mobile device (for example, information processing apparatus, wireless communication apparatus, or electronic device) with a wireless communication function. Here, the fixed device is, for example, a device, such as an access point and a base station in a wireless LAN (Local Area Network) system. Furthermore, the mobile device is, for example, a device, such as a smartphone, a mobile phone, and a tablet terminal.

In addition, each information processing apparatus (AP, STA) included in the communication system 10 has, for example, a communication function compliant with a wireless LAN standard of IEEE (Institute of Electrical and Electronic Engineers) 802.11. For example, each information processing apparatus can have a communication function compliant with a wireless LAN standard of IEEE 802.11ax. Furthermore, examples of the wireless LAN that can be used include Wi-Fi (Wireless Fidelity), Wi-Fi Direct, and Wi-Fi CERTIFIED Miracast specifications (technical specification name: Wi-Fi Display). Wireless communication may also be performed by using other communication systems.

The communications system 10 can be, for example, a wireless network including an access point (master station) and subordinate apparatuses (slave stations) of the access point. For example, the information processing apparatus (AP1) 100 can be an access point, and the information processing apparatus (STA1-1) 101 and the information processing apparatus (STA1-2) 102 can be subordinate apparatuses of the information processing apparatus (AP1) 100. In addition, the information processing apparatus (AP1) 100, the information processing apparatus (STA1-1) 101, and the information processing apparatus (STA1-2) 102 form a BSS (Basic Service Set). In FIG. 1, circles corresponding to these are indicated by circles painted white inside.

Similarly, for example, the information processing apparatus (AP2) 110 can be an access point, and the information processing apparatus (STA2-1) 111 and the information processing apparatus (STA2-2) 112 can be subordinate apparatuses of the information processing apparatus (AP2) 110. In addition, the information processing apparatus (AP2) 110, the information processing apparatus (STA2-1) 111, and the information processing apparatus (STA2-2) 112 form a BSS. In FIG. 1, circles corresponding to these are indicated by circles painted gray inside.

Similarly, for example, the information processing apparatus (AP3) 120 can be an access point, and the information processing apparatus (STA3-1) 121 and the information processing apparatus (STA3-2) 122 can be subordinate apparatuses of the information processing apparatus (AP3) 120. In addition, the information processing apparatus (AP3) 120, the information processing apparatus (STA3-1) 121, and the information processing apparatus (STA3-2) 122 form a BSS. In FIG. 1, circles corresponding to these are indicated by circles painted black inside.

In addition, the wave reaching ranges 130 to 132, 140 to 142, and 150 to 152 of the information processing apparatuses (AP, STA) are indicated by circles with dotted lines different in each BSS.

In addition, in the example illustrated in FIG. 1, each information processing apparatus (AP, STA) included in the communication system 10 controls the transmission power and controls the reception sensitivity. Therefore, for example, the station (information processing apparatus (STA)) near the access point (information processing apparatus (AP)) is capable of transmission with lower transmission power. On the other hand, the station (information processing apparatus (STA)) far from the access point (information processing apparatus (AP)) is capable of transmission with larger transmission power.

In this way, FIG. 1 illustrates an example of an environment including a plurality of BSSs overlapped on the same space. In this way, another BSS overlapping the BSS including a reference device will be referred to as an OBSS (Overlapping Basic Service Set) in the description. In other words, the OBSS can be another network that does not include the reference device and that transmits a radio wave reaching at least the reference device.

In FIG. 1, the information processing apparatus (AP1) 100, the information processing apparatus (STA1-1) 101, and the information professing apparatus (STA1-2) 102 form one BSS. In addition, on the basis of the BSS, there is a first OBSS (OBSS1) including the information processing apparatus (AP2) 110, the information processing apparatus (STA2-1) 111, and the information processing apparatus (STA2-2) 112. In this case, the information processing apparatus (STA1-1) 101 can receive signals from the information processing apparatus (AP2) 110 and the information processing apparatus (STA2-1) 111 among the devices belonging to the first OBSS (OBSS1).

Therefore, for example, the information processing apparatus (STA1-1) 101 can receive an RTS (Request to Send) frame and a CTS (Clear to Send) frame from the information processing apparatus (STA2-1) 111 belonging to the first OBSS (OBSS1). The information processing apparatus (STA1-1) 101 can also receive a CTS frame (CTS to Self frame) from the information processing apparatus (AP2) 110. Therefore, on the basis of the signal from each device belonging to the OBSS, the information processing apparatus (STA1-1) 101 needs to set an NAV (Network Allocation Vector) for coexistence with the OBSS. Note that in the description of the embodiment of the present technique, the NAV set on the basis of the signal from each device belonging to the OBSS will be referred to as an ONAV (Overlapping Network Allocation Vector).

Furthermore, on the basis of the BSS including the information processing apparatus (STA1-1) 101, there is a second OBSS (OBSS2) including the information processing apparatus (AP3) 120, the information processing apparatus (STA3-1) 121, and the information processing apparatus (STA3-2) 122 in FIG. 1. In this case, the information processing apparatus (STA1-1) 101 can receive a signal from the information processing apparatus (STA3-1) 121 among the devices belonging to the second OBSS (OBSS2).

Therefore, for example, the information processing apparatus (STA1-1) 101 can receives an RTS frame and a CTS frame from the information processing apparatus (STA3-1) 121 belonging to the second OBSS (OBSS2). However, it is difficult for the information processing apparatus (STA1-1) 101 to receive a CTS (CTS to Self frame) from the information processing apparatus (AP3) 120 belonging to the second OBSS (OBSS2). Therefore, the information processing apparatus (STA1-1) 101 can arbitrarily set the ONAV on the basis of the signal from each device belonging to the second OBSS (OBSS2).

Note that in FIG. 1, dotted lines indicate the wave reaching ranges 130 to 132 of the respective devices of the BSS including the information processing apparatus (STA1-1) 101. Furthermore, one-dot chain lines indicate the wave reaching ranges 140 to 142 of the respective devices belonging to the first OBSS (OBSS1), and two-dot chain lines indicate the wave reaching ranges 150 to 152 of the respective devices belonging to the second OBSS (OBSS2).

Note that in the communication system 10, the required transmission power is set every time the positional relationship of the information processing apparatuses (AP, STA) moves during the operation, and the wave reaching ranges are also changed every time the positional relationship moves.

[Configuration Example of Information Processing Apparatus]

Figure 2:
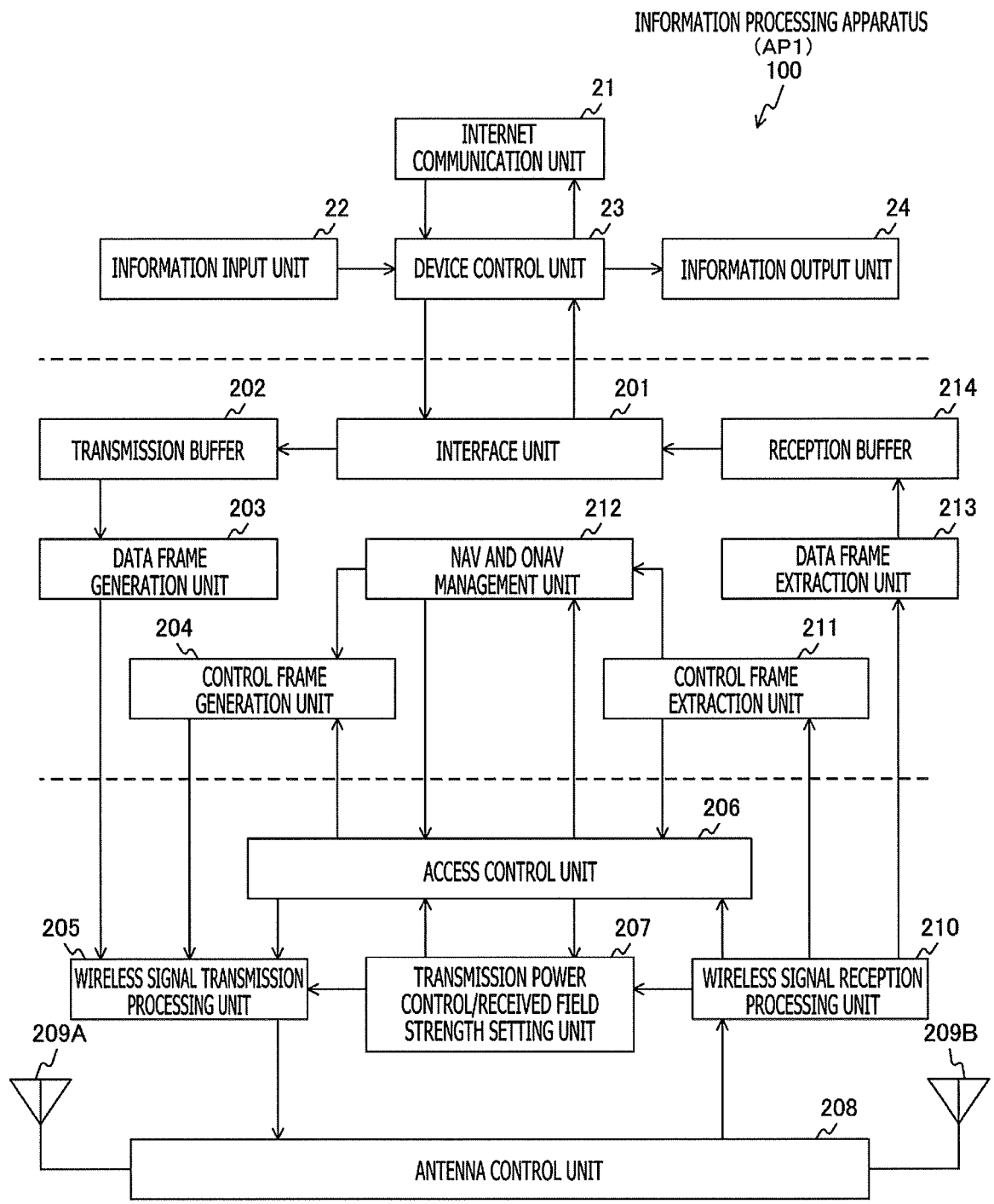
FIG. 2 is a block diagram illustrating a functional configuration example of an information processing apparatus (AP1) 100 according to the embodiment of the present technique.

FIG. 2 is a block diagram illustrating a functional configuration example of the information processing apparatus (AP1) 100 according to the embodiment of the present technique.

Although FIG. 2 illustrates only the functional configuration example of the information processing apparatus (AP1) 100 for the convenience, the functional configurations (functional configurations related to wireless communication) of the other information processing apparatuses (AP, STA) are also similar. Furthermore, in the description of the embodiment of the present technique, although the information processing apparatus (AP) as the access point and the other information processing apparatuses (STA) have the same configuration for the convenience, part of the configuration may be different according to the devices. For example, in the case of the access point (AP), an Internet communication unit 21 may be connected to the Internet through a wired network. In addition, a device control unit 23 may control the configurations.

The information processing apparatus (AP1) 100 includes the Internet communication unit 21, an information input unit 22, the device control unit 23, and an information output unit 24. Each of the components is an example of the system configuration in the information processing apparatus (AP1) 100 and may be provided as necessary. In addition, part or all of the functions of the components may provide a wireless communication system.

Furthermore, the information processing apparatus (AP1) 100 may operate as a wireless communication device or a wireless communication module excluding the components.

The Internet communication unit 21 is a communication unit for connection to the Internet.

The information input unit 22 is an information input unit that receives input of information (for example, keyboard input) from the user and that acquires various types of information (for example, image information and sound information).

The information output unit 24 is an information output unit that outputs information to the user (for example, indication of an image and video on a display and audio output of sound information and music information).

The device control unit 23 is configured to control the entire system in the information processing apparatus (AP1) 100.

The information processing apparatus (AP1) 100 further includes an interface unit 201, a transmission buffer 202, a data frame generation unit 203, a control frame generation unit 204, a wireless signal transmission processing unit 205, an access control unit 206, a transmission power control/received field strength setting unit 207, an antenna control unit 208, antenna elements 209A and 209B, a wireless signal reception processing unit 210, a control frame extraction unit 211, an NAV and ONAV management unit 212, a data frame extraction unit 213, and a reception buffer 214. Each of the components is realized by, for example, a wireless communication module specialized for wireless communication.

The interface unit 201 is an interface that receives application data on the basis of input of information from the user and that outputs application data. For example, the interface unit 201 receives wirelessly transmitted application data from the device control unit 23 on the basis of the input of information from the user and causes the transmission buffer 202 to hold the application data. The interface unit 201 outputs, to the device control unit 23, wirelessly received application data as information for the user.

The transmission buffer 202 is a transmission buffer that temporarily holds data to be transmitted from the information processing apparatus (AP1) 100 to another information processing apparatus. The transmission buffer 202 then supplies the held data to the data frame generation unit 203.

The data frame generation unit 203 is configured to construct the data (transmission data) held in the transmission buffer 202 into a predetermined data frame format for wireless transmission. The data frame generation unit 203 then outputs the generated data frame to the wireless signal transmission processing unit 205.

The control frame generation unit 204 is configured to construct control frames, such as an RST frame, a CTS frame, and an ACK frame, according to data transmission on the basis of an instruction from the NAV and ONAV management unit 212. The control frame generation unit 204 then outputs the generated control frame to the wireless signal transmission processing unit 205.

The wireless signal transmission processing unit 205 is configured to convert a transmitted data frame into a high-frequency signal as a baseband signal. The wireless signal transmission processing unit 205 then outputs the baseband signal converted into the high-frequency signal to the antenna control unit 208 on the basis of control of the access control unit 206.

The access control unit 206 is an access control unit that controls access in communication on a wireless transmission path in compliance with a predetermined wireless communication protocol. For example, the access control unit 206 can control the access in the communication on the wireless transmission path on the basis of details of management by the NAV and ONAV management unit 212. For example, while all the NAV and the ONAVs of the OBSSs as management targets of the NAV and ONAV management unit 212 are cancelled, the access control unit 206 performs control for transmitting a signal to the wireless transmission path. Furthermore, for example, the access control unit 206 can perform control not to transmit a signal to the wireless transmission path until all the NAV and the ONAVs of the OBSSs as management targets of the NAV and ONAV management unit 212 are cancelled.

The transmission power control/received field strength setting unit 207 is a transmission power control/received field strength setting unit that sets desired transmission power and signal detection level of received field strength.

The antenna control unit 208 is an antenna control unit that controls an antenna for transmitting a signal to the wireless transmission path and receiving a signal from the wireless transmission path.

The antenna elements 209A and 209B are antenna elements as a plurality of antenna elements that transmit or receive signals.

The wireless signal reception processing unit 210 is configured to extract a baseband signal from a high-frequency signal received through the antenna. The wireless signal reception processing unit 210 then outputs the extracted baseband signal to the access control unit 206, the control frame extraction unit 211, and the data frame extraction unit 213.

The control frame extraction unit 211 is configured to extract, from the baseband signal, predetermined control frames, such as an RTS frame, a CTS frame, and a ACK frame, indicating the situation of usage of the transmission path. The control frame extraction unit 211 then outputs the extracted control frames to the access control unit 206 and the NAV and ONAV management unit 212.

The NAV and ONAV management unit 212 is configured to manage the NAV set in the BSS including the apparatus and manage, for each OBSS, the ONAVs set in the OBSSs. For example, the NAV and ONAV management unit 212 can set the NAV on the basis of the control signal (control frame) received from another information processing apparatus belonging to the BSS of the apparatus. Furthermore, for example, the NAV and ONAV management unit 212 can set the ONAV of each OBSS on the basis of the control signal (control frame) received from another information processing apparatus belonging to the OBSS. In this case, the NAV and ONAV management unit 212 can manage, for each of a plurality of OBSSs, the ONAVs set in the plurality of OBSSs. Note that an example of managing the NAV and the ONAVs by the NAV and ONAV management unit 212 will be described in detail with reference to FIG. 6. In addition, the NAV and ONAV management unit 212 is an example of a management unit described in the claims.

The data frame extraction unit 213 is configured to extract data included in the data frame from the baseband signal. The data frame extraction unit 213 then causes the reception buffer 214 to hold the extracted data.

The reception buffer 214 is a reception buffer that temporarily holds received data and the like until data in predetermined units is collected. The reception buffer 214 then supplies the held data to the interface unit 201.

[Configuration Example of Frame Format]

Figure 3:
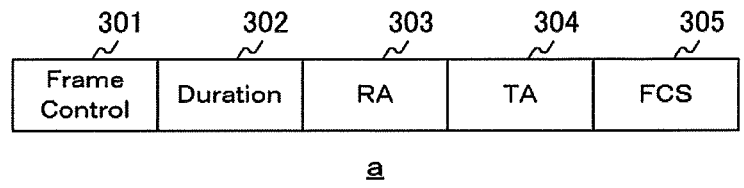
FIG. 3 depicts a configuration example of a frame format exchanged between devices as a basis of the present technique.
Figure 3:
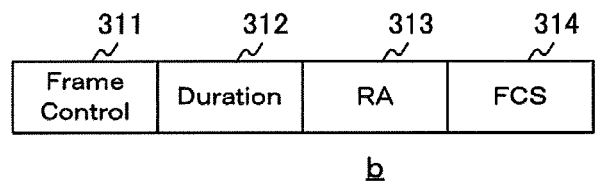
Figure 3:
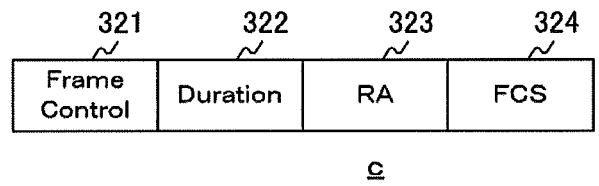
Figure 3:
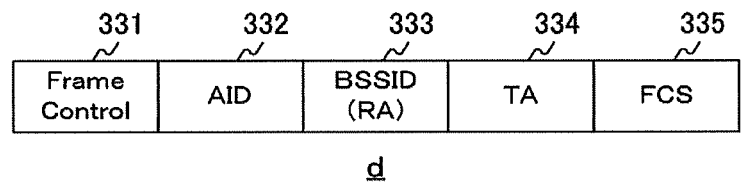
Figure 3:
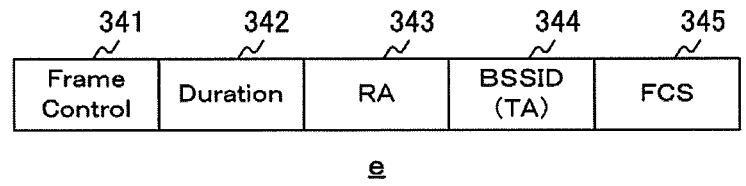
Figure 3:
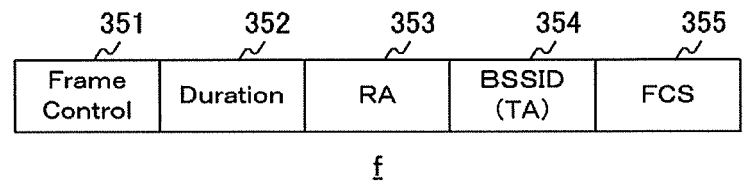

FIG. 3 depicts a configuration example of a frame format exchanged between devices as a basis of the present technique.

In FIG. 3, a illustrates a configuration example of an RTS (Request to Send) frame. The RTS frame includes Frame Control 301, Duration 302, RA (Receive Address) 303, TA (Transmit Address) 304, and FCS (Frame Check Sequence) 305.

Information for designating the format of the RTS frame is stored in the Frame Control 301. Duration information for setting the NAV is stored in the Duration 302.

A reception side address is designated in the RA 303. A transmission side address is designated in the TA 304. For example, in a case of transmitting the RTS frame from the information processing apparatus (STA) to the information processing apparatus (AP), address information (for example, MAC (Media Access Control) address) of the information processing apparatus (AP) is stored in the RA 303. Address information of the information processing apparatus (STA) is also stored in the TA 304.

Information for error detection is stored in the FCS 305.

In FIG. 3, b illustrates a configuration example of a CTS (Clear to Send) frame. The CTS frame includes Frame Control 311, Duration 312, RA 313, and FCS 314.

Information for designating the format of the CTS frame is stored in the Frame Control 311. Duration information for setting the NAV is stored in the Duration 312.

A target address is designated in the RA 313. For example, in a case where the CTS frame corresponding to the RTS frame from the information processing apparatus (STA) to the information processing apparatus (AP) is transmitted from the information processing apparatus (AP) to the information processing apparatus (STA), address information of the information processing apparatus (STA) is stored in the RA 313. That is, a copy of the TA 304 illustrated in a of FIG. 3 is stored in the RA 313.

Information for error detection is stored in the FCS 314.

In FIG. 3, c illustrates a configuration example of an ACK (Acknowledgement) frame. The ACK frame includes Frame Control 321, Duration 322, RA 323, and FCS 324.

Information for designating the format of the ACK frame is stored in Frame Control 321. Duration information for setting the NAV is stored in the Duration 322.

A target address is designated in the RA 323. Information for error detection is stored in the FCS 324.

In FIG. 3, d illustrates a configuration example of a PS-Poll (Power Save Polling) frame. The PS-Poll frame includes Frame Control 331, AID (Association Identifier) 332, BSSID (RA) 333, TA 334, and FCS 335.

Information for designating the format of the PS-Poll frame is stored in the Frame Control 331. Information related to an association identifier is stored in the AID 332.

BSSID information is designated as a reception side address in the BSSID (RA) 333. A transmission side address is designated in the TA 334. Information for error detection is stored in the FCS 335.

In FIG. 3, e illustrates a configuration example of a CF-END (Contention Free End) frame. The CF-END frame includes Frame Control 341, Duration 342, RA 343, BSSID (TA) 344, and FCS 345.

Information for designating the format of the CF-END frame is stored in the Frame Control 341. Duration information for setting the NAV is stored in the Duration 342.

A reception side address is designated in the RA 343. BSSID information is designated as a transmission side address in the BSSID (TA) 344. Information for error detection is stored in the FCS 345.

In FIG. 3, f illustrates a configuration example of a CF-END+CF-ACK (Contention Free End+Contention Free Ack) frame. The CF-END+CF-ACK frame includes Frame Control 351, Duration 352, RA 353, BSSID (TA) 354, and FCS 355.

Information for designating the format of the CF-END+ CF-ACK frame is stored in the Frame Control 351. Duration information for setting the NAV is stored in the Duration 352.

A reception side address is designated in the RA 353. BSSID information is designated as a transmission side address in the BSSID (TA) 354. Information for error detection is stored in the FCS 355.

[Example of Setting NAV]

Figure 4:
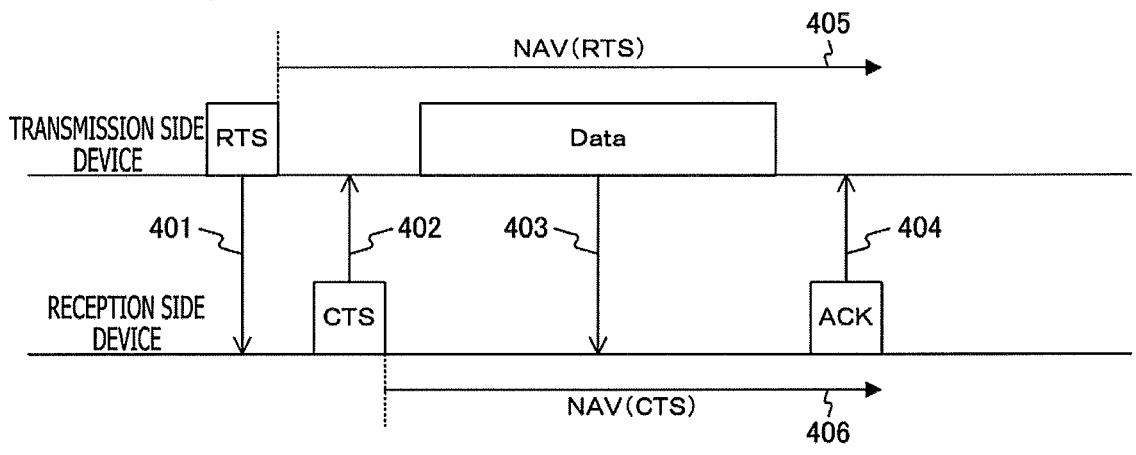
FIG. 4 depicts an example of setting and cancelling an NAV as a basis of the present technique.
Figure 4:
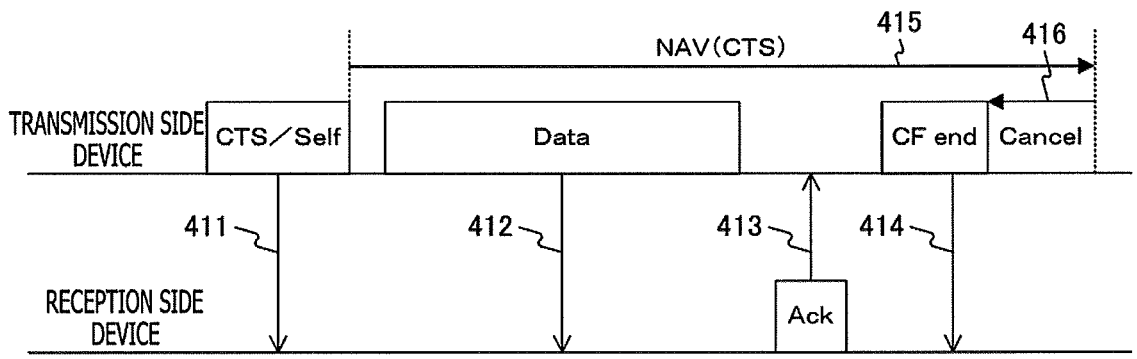
Figure 4:
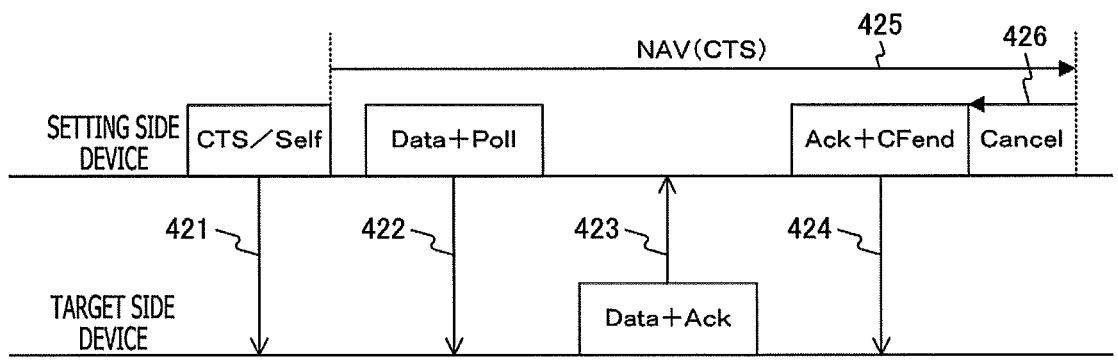

FIG. 4 depicts an example of setting and cancelling an NAV as a basis of the present technique. Note that the horizontal axis illustrated in FIG. 4 indicates a time axis. Furthermore, above the time axis corresponding to each device in FIG. 4, data to be transmitted is indicated by rectangles provided with content inside.

In FIG. 4, a illustrates an example of a case of setting the NAV by exchanging an RTS frame and a CTS frame. In FIG. 4, a illustrates an example of communication between a device on the transmission side of data (transmission side device) and a device on the reception side of data (reception side device) and an example of setting the NAV.

First, the transmission side device transmits an RTS frame to the reception side device before transmitting the data to the reception side device (401). A time period (transmission suppression time period) of setting the NAV is stored in the Duration 302 (illustrated in a of FIG. 3) in the RTS frame. The transmission side device further sets the NAV on the basis of the virtual carrier sense throughout the time period stored in the Duration 302 (illustrated in a of FIG. 3) in the RTS frame (405).

In addition, in a case where the RTS frame is received, the reception side device transmits a CTS frame for the RTS frame to the transmission side device (402). A time period (transmission suppression time period) of setting the NAV is stored in the Duration 312 (illustrated in b of FIG. 3) in the CTS frame. The reception side device further sets the NAV on the basis of the virtual carrier sense throughout the time period stored in the Duration 312 (illustrated in b of FIG. 3) in the CTS frame (406). Note that end timing of the NAV set in the transmission side device and end timing of the NAV set in the reception side device are the same.

In the period (405) in which the NAV is set in this way, the transmission side device transmits data (Data) to the reception side device (403). In addition, an acknowledgement (Ack) is exchanged as necessary (404).

In FIG. 4, b illustrates an example of a case of setting the NAV on the basis of CTS-to-self. In FIG. 4, b illustrates an example of communication between a device on the transmission side of data (transmission side device) and a device on the reception side of data (reception side device) and an example of setting and cancelling the NAV.

First, the transmission side device transmits a CTS-to-self frame to the reception side device before transmitting data to the reception side device (411). A time period (transmission suppression time period) of setting the NAV is stored in the Duration 312 (illustrated in b of FIG. 3) in the CTS-to-self frame. In this case, a maximum value is stored as the transmission suppression time period.

The transmission side device and the reception side device further set the NAV as a CF (Contention Free) region throughout the time period stored in the Duration 312 (illustrated in b of FIG. 3) in the CTS-to-self frame (415).

Subsequently, in the period (415) in which the NAV is set, the transmission side device transmits data (Data) to the reception side device (412). An acknowledgement (Ack) is also exchanged as necessary (413).

Here, in a case where there is a remaining time period in the NAV set on the basis of the CTS-to-self frame, the transmission side device transmits a CF-END frame to the reception side device to inform that the CF period is finished (414). In this way, the transmission side device can transmit the CF-END frame to the reception side device to cancel the previously set NAV as a CF region (416).

In FIG. 4, c illustrates an example of a case of setting the NAV on the basis of CTS-to-self. In FIG. 4, c illustrates an example of communication between a device on the setting side of setting the NAV (setting side device) and a target device of the device (target side device) and an example of setting and cancelling the NAV. Note that the example illustrated in c of FIG. 4 is a modification of b of FIG. 4, and the description of the part in common with b of FIG. 4 will not be repeated.

As in the example illustrated in b of FIG. 4, the setting side device transmits a CTS-to-self frame to the target side device (421). The setting side device and the target side device further set the NAV as a CF region throughout the time period stored in the Duration 312 (illustrated in b of FIG. 3) in the CTS-to-self frame (425).

Subsequently, in a period in which the NAV is set (425), the setting side device transmits data (Data+Poll) to the target side device (422). After the data transmission, the setting side device also receives data and an acknowledgement (Data+Ack) from the target side device designated by Poll (423).

Here, in a case where there is a remaining time period in the NAV set on the basis of the CTS-to-self frame, the setting side device transmits a frame for informing that the CF period is finished to the target side device (424). That is, the setting side device transmits a frame including an acknowledgement and CF-END (Ack+CFend) to the target side device (424). In this way, the setting side device can transmit the CF-END frame to the target side device to cancel the previously set NAV as a CF region (426).

[Example of Setting and Cancelling ONAV]

Figure 5:
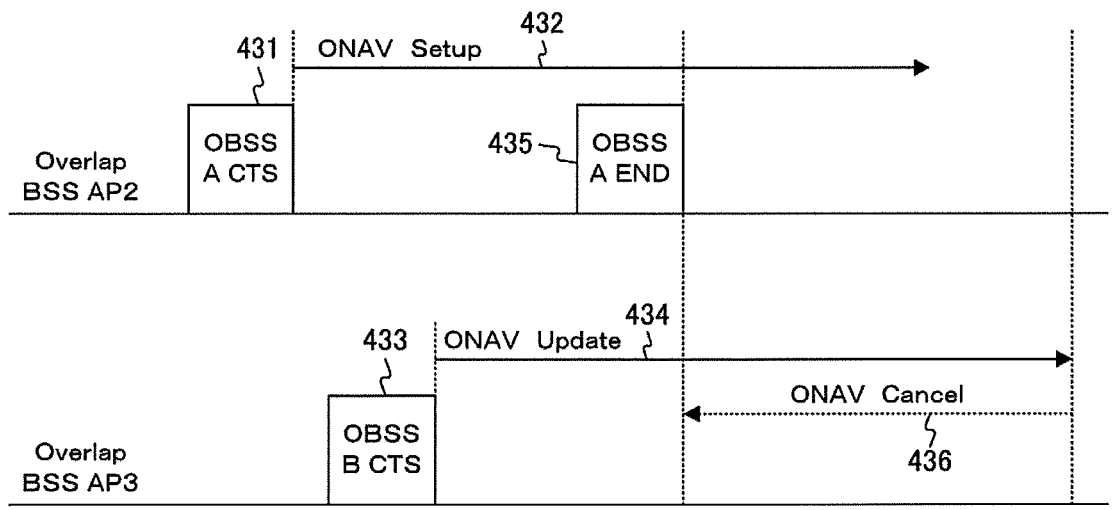
FIG. 5 depicts an example of setting and cancelling an ONAV as a basis of the present technique.
Figure 5:
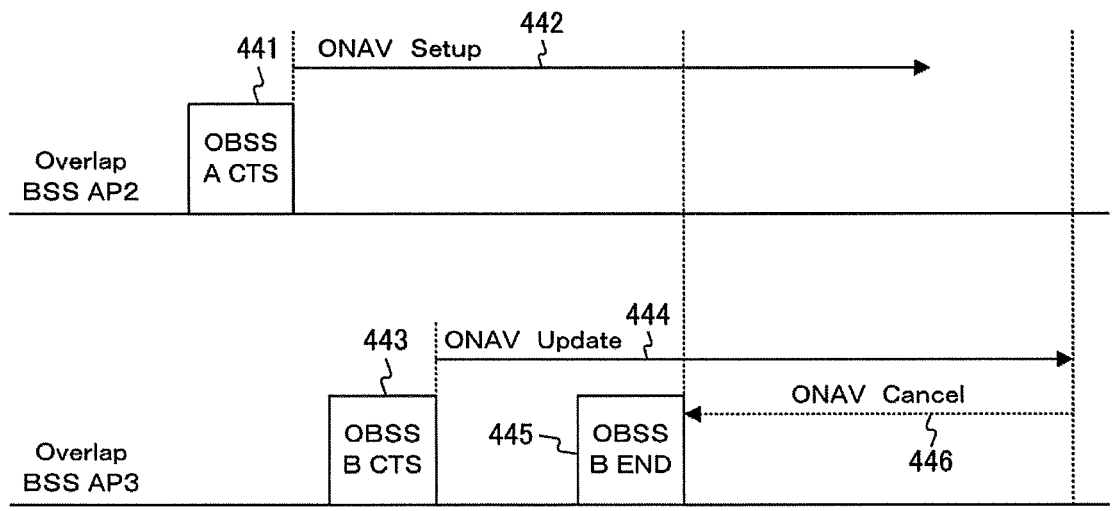

FIG. 5 depicts an example of setting and cancelling the ONAV as a basis of the present technique. Note that the horizontal axis illustrated in FIG. 5 indicates a time axis. FIG. 5 also illustrates two devices (OBSS AP2, OBSS AP3) as devices belonging to the OBSSs. Furthermore, above the time axis corresponding to each device, data to be transmitted from each device is indicated by rectangles provided with content inside. Note that FIG. 5 illustrates a comparative example of FIG. 7.

In FIG. 5, a and b illustrate examples of a case of setting and cancelling one ONAV for a plurality of OBSSs. In FIG. 5, a and b illustrate examples of managing a longest time period (time period stored in Duration) as the ONAV of the OBSSs in a case where signals are received from a plurality of OBSSs.

In FIG. 5, a illustrates an example of a case of receiving a CF-END frame from the OBSS AP2.

For example, in a case where an information processing apparatus (STA) 1 (not illustrated) receives a CTS frame (OBSS A CTS) from the OBSS AP2 (431), the information processing apparatus (STA) 1 sets the ONAV on the basis of the value stored in the Duration in the CTS frame (432). In addition, in a case where the information processing apparatus (STA) 1 receives a CTS frame (OBSS B CTS) from the OBSS AP3 after setting the ONAV (433), the information processing apparatus (STA) 1 updates the ONAV on the basis of the value stored in the Duration in the CTS frame (434). The example illustrated in a of FIG. 5 illustrates an example of a case where the ONAV is extended by the update of the ONAV.

In a case where the information processing apparatus (STA) 1 receives a CF-END frame from the OBSS AP2 after updating the ONAV (435), the information processing apparatus (STA) 1 cancels the updated ONAV (436).

In this way, although there is a remaining time period of the ONAV of the OBSS AP3, the information processing apparatus (STA) 1 cancels the updated ONAV on the basis of the CF-END frame from the OBSS AP2. In this case, the information processing apparatus (STA) 1 may not be able to figure out that the OBSS AP3 is using the wireless transmission path and may start data transmission of the apparatus. In this way, there may be a collision between the information processing apparatus (STA) 1 and the OBSS AP3 in the case where the data transmission from the information processing apparatus (STA) 1 is started.

In FIG. 5, b illustrates an example of a case of receiving a CF-END frame from the OBSS AP3.

Note that the information processing apparatus (STA) 1 sets the ONAV in response to the reception of the CTS frame from the OBSS AP2 and updates the ONAV in response to the reception of the CTS frame from the OBSS AP3 (441 to 444), and this is similar to the example illustrated in a of FIG. 5.

In a case where the information processing apparatus (STA) 1 receives a CF-END frame from the OBSS AP3 after updating the ONAV (445), the information processing apparatus (STA) 1 cancels the updated ONAV (446).

In this way, although there is a remaining time period of the ONAV of the OBSS AP2, the information processing apparatus (STA) 1 cancels the updated ONAV on the basis of the CF-END frame from the OBSS AP3. In this case, the information processing apparatus (STA) 1 may not be able to figure out that the OBSS AP2 is using the wireless transmission path and may start data transmission of the apparatus. In this way, there may be a collision between the information processing apparatus (STA) 1 and the OBSS AP2 in the case where the data transmission from the information processing apparatus (STA) 1 is started.

Therefore, the embodiment of the present technique illustrates an example of individually managing the NAV (ONAV) for each of the plurality of OBSSs to allow appropriate wireless communication even in an environment including a plurality of OBSSs.

Note that in the embodiment of the present technique, on the basis of a device as a target (target device), the NAV of the BSS including the target device will be referred to as NAV. In addition, on the basis of the target device, the NAV of another BSS (OBSS) that is a BSS other than the BSS including the target device and that transmits a radio wave reaching the target device will be referred to as ONAV.

[Example of Managing NAV and ONAVs]

FIG. 6 depicts an example of managing the NAV and the ONAVs by the NAV and ONAV management unit 212 according to the embodiment of the present technique.

In FIG. 6, a illustrates an example of an ONAV information management table used to manage the ONAV for each of a plurality of OBSSs.

In the ONAV information management table, frame type 501, RA 502, TA 503, reception time 504, Duration 505, provisional registration 506, and reception signal strength 507 are associated and recorded.

The type of the frame received by the information processing apparatus (AP1) 100 from a device belonging to the OBSS is stored in the frame type 501. For example, the types of the frames illustrated in a to f of FIG. 3 are stored.

The RA stored in the frame received by the information processing apparatus (AP1) 100 from the device belonging to the OBSS is stored in the RA 502. For example, the information of the RAs 303, 313, 323, 333, 343, and 353 illustrated in a to f of FIG. 3 is stored.

The TA stored in the frame received by the information processing apparatus (AP1) 100 from the device belonging to the OBSS is stored in the TA 503. For example, the information of the TAs 304, 334, 344, and 354 illustrated in a and d to f of FIG. 3 is stored.

The time of the reception (or reception timing) of the frame by the information processing apparatus (AP1) 100 from the device belonging to the OBSS is stored in the reception time 504.

The value of the Duration stored in the frame received by the information processing apparatus (AP1) 100 from the device belonging to the OBSS is stored in the Duration 505. For example, the information of the Duration 302, 312, 322, 342, and 352 illustrated in a to c, e, and f of FIG. 3 is stored.

Information indicating one of definitive registration and provisional registration is stored in the provisional registration 506. For example, "0" is stored in the provisional registration 506 in the case of the definitive registration, and "1" is stored in the case of the provisional registration. Note that the definitive registration and the provisional registration will be described in detail with reference to FIG. 8.

The reception signal strength of the frame at the reception of the frame by the information processing apparatus (AP1) 100 from the device belonging to the OBSS is stored in the reception signal strength 507. An example of the reception signal strength that can be used includes RSSI (Received Signal Strength Indicator). Other radio wave condition information may also be stored instead of the reception signal strength. For example, PER (Packet Error Rate), BER (Bit Error Rate), the number of retransmissions of packet, throughput, drop frame, SIR (Signal to Interference Ratio), or SINR (Signal to Interference plus Noise Ratio) may be used.

In FIG. 6, b illustrates an example of an NAV information management table used to manage the NAV of the BSS including the information processing apparatus (AP1) 100.

In the NAV information management table, reception time 511 and Duration 512 are associated and recorded.

The time of the reception (or reception timing) of the frame by the information processing apparatus (AP1) 100 from the device belonging to the BSS of the apparatus is stored in the reception time 511.

The value of the Duration stored in the frame received by the information processing apparatus (AP1) 100 from the device belonging to the BSS of the apparatus is stored in the Duration 512.

[Example of Setting and Cancelling ONAV by Managing Each of a Plurality of OBSSs]

Figure 7:
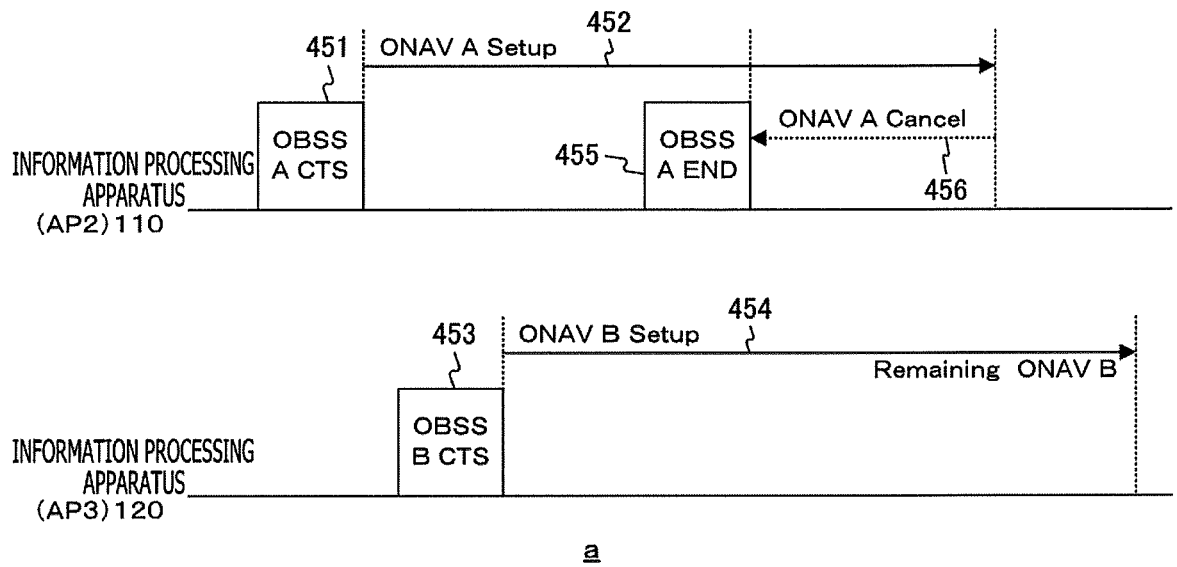
FIG. 7 depicts an example of managing the ONAV by the NAV and ONAV management unit 212 according to the embodiment of the present technique.
Figure 7:
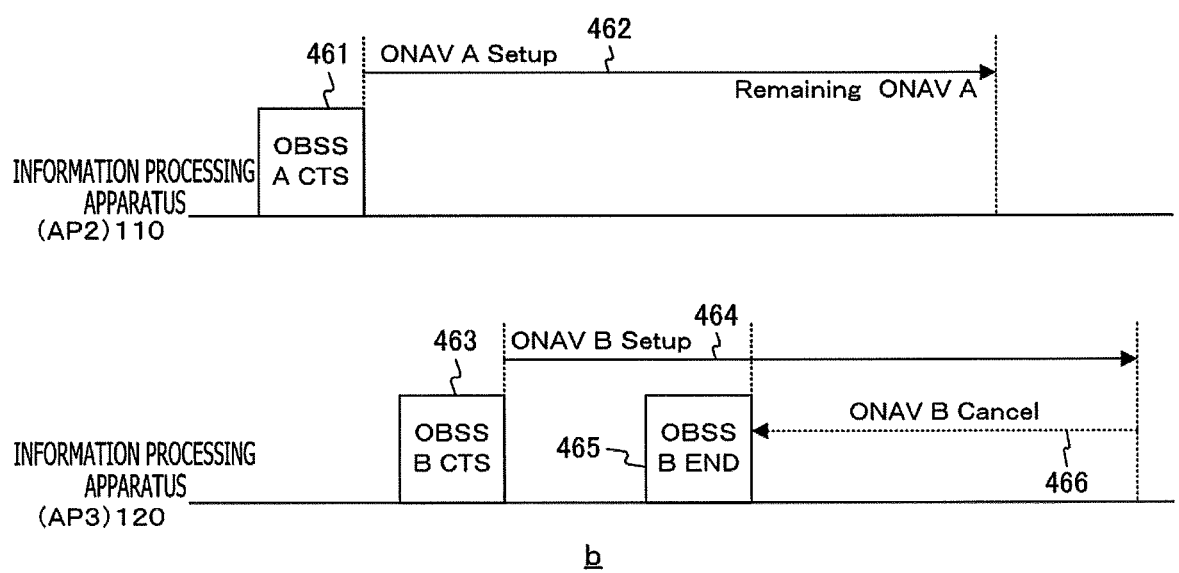

FIG. 7 depicts an example of managing the ONAV by the NAV and ONAV management unit 212 according to the embodiment of the present technique.

FIG. 7 illustrates an example of managing the ONAV by the information processing apparatus (AP1, STA1-1, or STA1-2) for each of a plurality of OBSSs (information processing apparatus of first OBSS (AP2, STA2-1, or STA2-2) and information processing apparatus of second OBSS (AP3, STA3-1, or STA3-2)) in the example illustrated in FIG. 1. That is, the NAV and ONAV management unit 212 included in the information processing apparatus 100 manages the ONAV for each of a plurality of OBSSs and sets and cancels the ONAV for each of a plurality of OBSSs in the illustrated example. Note that the horizontal axis illustrated in FIG. 7 indicates the time axis. Furthermore, above the time axis corresponding to each device, data to be transmitted from each device is indicated by rectangles provided with content inside.

In FIG. 7, a illustrates an example of a case where the information processing apparatus (AP1) 100 receives a CF-END frame from the information processing apparatus (AP2) 110.

For example, a case where the information processing apparatus (AP1) 100 receives a CTS frame (OBSS A CTS) from the information processing apparatus (AP2) 110 will be illustrated (451). In this case, the NAV and ONAV management unit 212 sets an ONAV (ONAV A) of the information processing apparatus (AP2) 110 on the basis of the CTS frame (452).

Specifically, the NAV and ONAV management unit 212 records each piece of information in the ONAV information management table illustrated in a of FIG. 6 on the basis of the CTS frame. Specifically, the NAV and ONAV management unit 212 records "CTS" in the frame type 501 and records the information of the RA 313 of the CTS frame (illustrated in b of FIG. 3) in the RA 520. The NAV and ONAV management unit 212 further records the time of the reception of the CTS frame in the reception time 504 and records the value of the Duration 312 of the CTS frame (illustrated in b of FIG. 3) in the Duration 505. The NAV and ONAV management unit 212 also records "0" in the provisional registration 506 and records the RSSI at the reception of the CTS frame in the reception signal strength 507. In this way, on the basis of the received CTS frame, the NAV and ONAV management unit 212 sets the ONAV (ONAV A) of the OBSS (information processing apparatus (AP2) 110) that has transmitted the CTS frame. In addition, in a case where the RTS frame is received just before the CTS frame, and it is recognized that the CTS frame is for the RTS frame, the CTS frame is managed along with the ONAV (ONAV A) of the OBSS (information processing apparatus (AP2) 110) that has transmitted the RTS frame to manage one ONAV for one OBSS.

Furthermore, a case where the information processing apparatus (AP1) 100 receives a CTS frame (OBSS B CTS) from the information processing apparatus (AP3) 120 after setting the ONAV A will be illustrated (453). In this case, the NAV and ONAV management unit 212 sets an ONAV (ONAV B) of the OBSS (information processing apparatus (AP3) 120) on the basis of the CTS frame (454). The setting method is similar to the setting method of the ONAV A of the information processing apparatus (AP2) 110, and the description will not be repeated here.

In this way, the NAV and ONAV management unit 212 sets and manages the ONAV for each of a plurality of OBSSs (information processing apparatus (AP2) 110 and information processing apparatus (AP3) 120).

A case where the information processing apparatus (AP1) 100 receives a CF-END frame from the information processing apparatus (AP2) 110 after setting the ONAV A and the ONAV B will be illustrated (455). In this case, the NAV and ONAV management unit 212 cancels the ONAV A of the information processing apparatus (AP2) 110 on the basis of the CF-END frame (456).

Specifically, on the basis of the CF-END frame, the NAV and ONAV management unit 212 deletes, from the ONAV information management table illustrated in a of FIG. 6, each piece of information corresponding to the ONAV A of the information processing apparatus (AP2) 110 that has transmitted the CF-END frame.

Specifically, the NAV and ONAV management unit 212 determines whether or not the BSSID (TA) 344 of the CF-END frame (illustrated in e of FIG. 3) coincides with the BSSID of the BSS including the apparatus. Then, in a case where the BSSID (TA) 344 of the CF-END frame is different from the BSSID of the BSS including the apparatus, the NAV and ONAV management unit 212 can figure out that the CF-END frame is transmitted from the OBSS. In this case, the NAV and ONAV management unit 212 extracts the RA coinciding with the RA 343 of the CF-END frame (illustrated in e of FIG. 3) from the RA 502 of the ONAV information management table illustrated in a of FIG. 6. The NAV and ONAV management unit 212 then deletes each piece of information associated with the coinciding RA 502 (each piece of information corresponding to the ONAV A of the information processing apparatus (AP2) 110) from the ONAV information management table.

Note that a broadcast address is written in the RA 343 of the CF-END frame in the RA 502 of the ONAV information management table, and in a case where there is no frame coinciding with the RTS frame or the CTS frame, there is a possibility that the CF-END frame is transmitted from an OBSS not registered in the ONAV information management table. Therefore, the NAV and ONAV management unit 212 ignores the CF-END frame in this case and does not execute the process of deletion from the ONAV information management table.

In this way, in the case where the CF-END frame is received from the information processing apparatus (AP2) 110 (455), only the ONAV A of the information processing apparatus (AP2) 110 is cancelled (456), and the setting of the ONAV B of the information processing apparatus (AP3) 120 is maintained (454). Therefore, the information processing apparatus (AP1) 100 can figure out that the information processing apparatus (AP3) 120 is using the wireless transmission path in the period of the ONAV B of the information processing apparatus (AP3) 120 and can prevent the start of the data transmission of the apparatus. This can prevent a collision between the information processing apparatus (AP1) 100 and the information processing apparatus (AP3) 120.

In FIG. 7, b illustrates an example of a case where the information processing apparatus (AP1) 100 receives a CF-END frame from the information processing apparatus (AP3) 120.

Note that the information processing apparatus (AP1) 100 sets the ONAV A in response to the reception of the CTS frame from the information processing apparatus (AP2) 110 and sets the ONAV B in response to the reception of the CTS frame from the information processing apparatus (AP3) 120 (461 to 464), and this is similar to the example illustrated in a of FIG. 7.

A case where the information processing apparatus (AP1) 100 receives a CF-END frame from the information processing apparatus (AP3) 120 after setting the ONAV A and the ONAV B will be illustrated (465). In this case, the NAV and ONAV management unit 212 cancels the ONAV B of the information processing apparatus (AP3) 120 on the basis of the CF-END frame (466).

Specifically, on the basis of the CF-END frame, the NAV and ONAV management unit 212 deletes, from the ONAV information management table illustrated in a of FIG. 6, each piece of information corresponding to the ONAV B of the information processing apparatus (AP3) 120 that has transmitted the CF-END frame. Note that the deletion method is similar to the example illustrated in a of FIG. 7, and the description will not be repeated here.

In this way, in the case where the CF-END frame is received from the information processing apparatus (AP3) 120 (465), only the ONAV B of the information processing apparatus (AP3) 120 is cancelled (466), and the setting of the ONAV A of the information processing apparatus (AP2) 110 is maintained (462). Therefore, the information processing apparatus (AP1) 100 can figure out that the information processing apparatus (AP2) 110 is using the wireless transmission path in the period of the ONAV A of the information processing apparatus (AP2) 110 and can prevent the start of the data transmission of the apparatus. This can prevent a collision between the information processing apparatus (AP1) 100 and the information processing apparatus (AP2) 110.

In this way, the ONAV is individually managed for each of a plurality of OBSSs in the embodiment of the present technique, and this allows appropriate wireless communication even in the environment including a plurality of OBSSs.

Note that although FIG. 7 illustrates an example in which the NAV and ONAV management unit 212 manages the ONAVs for two OBSSs, the NAV and ONAV management unit 212 can similarly manage the ONAVs for three or more OBSSs.

In addition, there may be a case where there are a large number of OBSSs as management targets of the NAV and ONAV management unit 212. In such a case, only a predetermined number of OBSSs may be set as the management targets based on a predetermined rule. For example, on the basis of the reception time 504 and the Duration 505 of the ONAV information management table illustrated in a of FIG. 6, a predetermined number of OBSSs can be sequentially selected as the management targets from the OBSS with the latest cancel timing of ONAV. Furthermore, for example, on the basis of the reception signal strength 507 of the ONAV information management table illustrated in a of FIG. 6, a predetermined number of OBSSs can be sequentially selected as the management targets from the OBSS with the best value of RSSI.

[Operation Example of Information Processing Apparatus]

Figure 8:
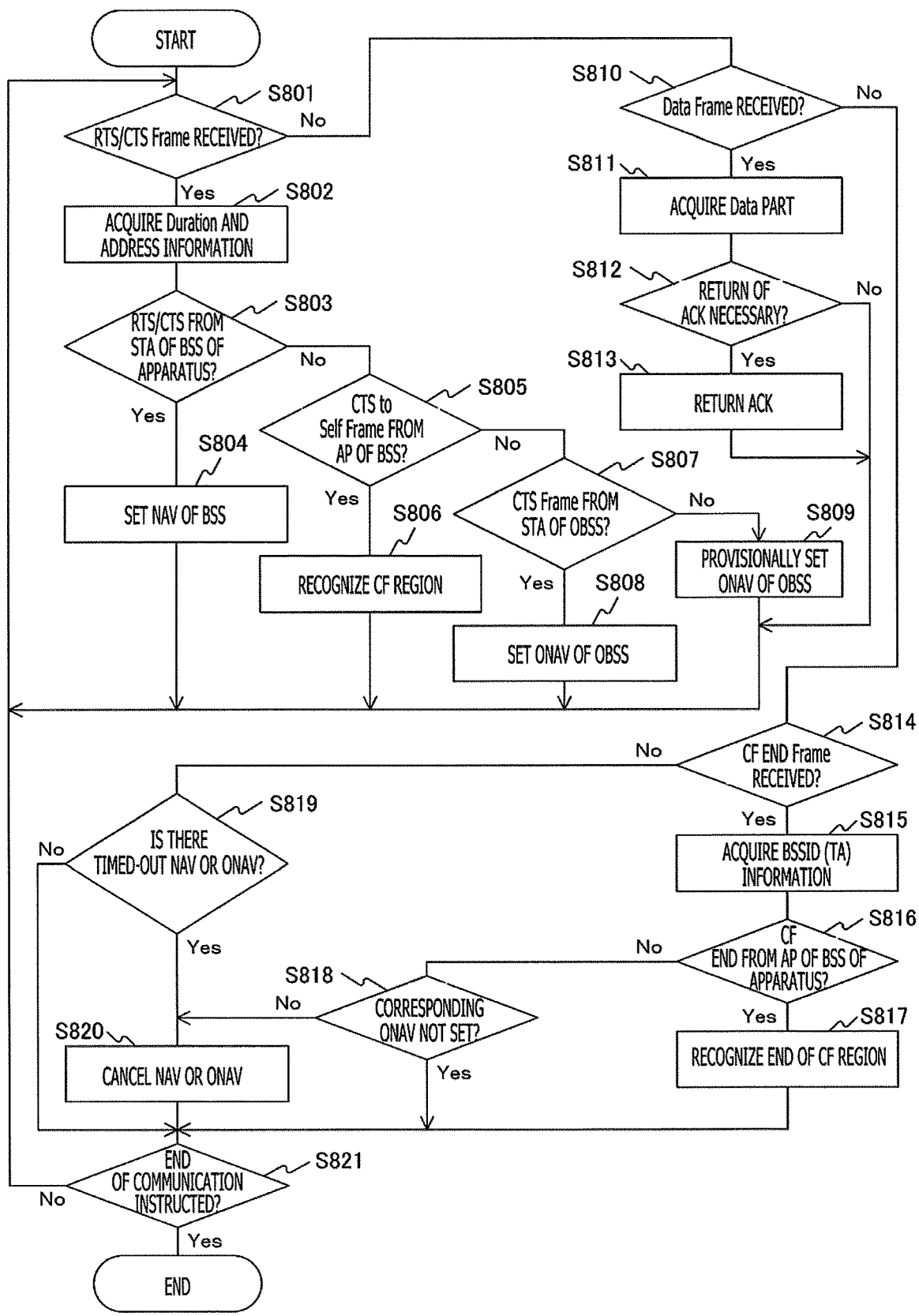
FIG. 8 is a flow chart illustrating an example of a processing procedure of an NV and ONAV management process by the information processing apparatus according to the embodiment of the present technique.

FIG. 8 is a flow chart illustrating an example of a processing procedure of an NV and ONAV management process by the information processing apparatus according to the embodiment of the present technique. To facilitate the description, the components illustrated in FIG. 2 will be used in the description of FIG. 8.

In a case where an RTS frame or a CTS frame is received (step S801), the control frame extraction unit 211 extracts each piece of information (for example, Duration and address information) from the received RTS frame or CTS frame (step S802).

Subsequently, the NAV and ONAV management unit 212 determines whether or not the RTS frame or the CTS frame is from another information processing apparatus (STA) belonging to the BSS of the apparatus on the basis of the extracted information (address information) (step S803). Then, if the RTS frame or the CTS frame is from another information processing apparatus (STA) belonging to the BSS of the apparatus (step S803), the NAV and ONAV management unit 212 sets the NAV on the basis of the extracted Duration (step S804). For example, the NAV and ONAV management unit 212 records the reception time of the RTS frame or the CTS frame in the reception time 511 and records the value of the extracted Duration in the Duration 512 in the NAV information management table illustrated in b of FIG. 6.

In addition, if the frame is not the RTS frame or the CTS frame from another information processing apparatus (STA) belonging to the BSS of the apparatus (step S803), the NAV and ONAV management unit 212 determines whether or not the frame is a CTS-to-self frame from another information processing apparatus (AP) belonging to the BSS of the apparatus (step S805).

If the frame is a CTS-to-self frame from another information processing apparatus (AP) belonging to the BSS of the apparatus (step S805), the NAV and ONAV management unit 212 recognizes that a CF region is started (step S806). That is, the NAV and ONAV management unit 212 recognizes that a CF (Contention Free) region is set throughout the time period described in the extracted Duration (step S806).

In this way, in the case where the control signal received from an access point belonging to the BSS is a CTS frame, the NAV and ONAV management unit 212 can figure out that the data is to be transmitted in the BSS.

If the frame is not the CTS-to-self frame from another information processing apparatus (AP) belonging to the BSS (step S805), the NAV and ONAV management unit 212 determines whether or not the frame is a CTS frame from an information processing apparatus (STA) of an OBSS (step S807). If the frame is a CTS frame from an information processing apparatus (STA) of an OBSS (step S807), the NAV and ONAV management unit 212 sets the ONAV on the basis of the received CTS frame (step S808). For example, the NAV and ONAV management unit 212 records each piece of information (for example, RA and Duration) related to the received CTS frame and records "0" in the provisional registration 505 in the ONAV information management table illustrated in a of FIG. 6.

In this way, in the case where the control signal received from another information processing apparatus belonging to the OBSS is a CTS frame, the NAV and ONAV management unit 212 can set the ONAV of the OBSS as a management target.

On the other hand, if the frame is an RTS frame from an information processing apparatus (STA) of an OBSS (step S807), the NAV and ONAV management unit 212 provisionally sets (provisionally registers) the ONAV on the basis of the received RTS frame (step S809). For example, the NAV and ONAV management unit 212 records each piece of information (for example, RA, TA, and Duration) related to the received RTS frame and records "1" in the provisional registration 505 in the ONAV information management table illustrated in a of FIG. 6.

In this way, if an RTS frame is received from an information processing apparatus (STA) of an OBSS (step S807), the value of the Duration can be provisionally set (provisionally registered) as an ONAV value. Here, the provisionally set (provisionally registered) ONAV can be definitively registered in a case where a predetermined condition is satisfied. For example, in a case where a CTS frame corresponding to the RTS frame is received just after the reception of the RTS frame, and the TA in the RST frame and the RA in the CTS frame coincide, the ONAV can be definitively registered.

In addition, in the case where the ONAV is provisionally set (provisionally registered), control, such as lowering the packet detection threshold from a normal threshold, may be performed to facilitate the reception of the CTS frame.

Here, in a case where the CTS frame corresponding to the RTS frame is not received just after the reception of the RTS frame from the information processing apparatus (STA) of the OBSS, the data reception of the apparatus may not be affected. Therefore, instead of provisionally setting the ONAV, the ONAV may be set on a condition that the CTS frame (corresponding to the RTS frame) from the OBSS is received just after the reception of the RTS frame from the information processing apparatus (STA) of the OBSS.

Furthermore, if an RTS frame or a CTS frame is not received (step S801), whether or not a data frame is received is determined (step S810). Then, if a data frame is received (step S810), the data frame extraction unit 213 extracts a data part of the received data frame (step S811). Subsequently, whether or not an ACK corresponding to the received data frame needs to be returned is determined (step S812). Then, if an ACK needs to be returned (step S812), the ACK is returned (step S813). For example, the ACK is returned in a case where the data frame is correctly received on the basis of designation of an Ack Policy bit of the received data frame (step S813). Note that if an ACK does not have to be returned (step S812), the process returns to step S801.

If a data frame is not received (step S810), whether or not a CF-END frame is received is determined (step S814). Then, if a CF-END frame is received (step S814), the control frame extraction unit 211 extracts each piece of information (for example, Duration and address information) from the received CF-END frame (step S815).

Subsequently, the NAV and ONAV management unit 212 determines whether or not the CF-END frame is from the information processing apparatus (AP) belonging to the BSS of the apparatus on the basis of the extracted information (BSSID (TA)) (step S816). For example, in a case where the extracted BSSID (TA) is the address (BSSID) of the information processing apparatus (AP) belonging to the BSS of the apparatus, the NAV and ONAV management unit 212 determines that the CF-END frame is from the information processing apparatus (AP) belonging to the BSS of the apparatus (step S816). Then, if the CF-END frame is from the information processing apparatus (AP) belonging to the BSS of the apparatus (step S816), the NAV and ONAV management unit 212 recognizes that the CF region is finished (step S817).

In this way, in the case where the control signal received from the access point belonging to the BSS is a CF-END frame, the NAV and ONAV management unit 212 can figure out that the CF region is finished in the BSS and that the data is not transmitted from the access point (AP) of the BSS.

If the CF-END frame is not from the information processing apparatus (AP) belonging to the BSS of the apparatus (step S816), the NAV and ONAV management unit 212 determines whether or not an ONAV corresponding to the extracted BSSID (TA) is set (step S818). For example, the NAV and ONAV management unit 212 determines whether or not there is a TA coinciding with the extracted BSSID (TA) in the TA 503 illustrated in a of FIG. 6. Then, if there is a TA coinciding with the extracted BSSID (TA) in the TA 503 illustrated in a of FIG. 6, the NAV and ONAV management unit 212 determines that the ONAV corresponding to the extracted BSSID (TA) is set (step S818). On the other hand, if there is no TA coinciding with the extracted BSSID (TA) in the TA 503 illustrated in a of FIG. 6, the NAV and ONAV management unit 212 determines that the ONAV corresponding to the extracted BSSID (TA) is not set (step S818).

If the ONAV corresponding to the extracted BSSID (TA) is not set (step S818), the process proceeds to step S821. Furthermore, if the ONAV corresponding to the extracted BSSID (TA) is set (step S818), the NAV and ONAV management unit 212 cancels the ONAV corresponding to the extracted BSSID (TA) (step S820).

In this way, in the case where the control signal received from another information processing apparatus belonging to the OBSS is a CF-END frame, the NAV and ONAV management unit 212 can cancel the ONAV of the OBSS corresponding to the address information in the CF-END frame.

In addition, if a CF-END frame is not received (step S814), the NAV and ONAV management unit 212 determines whether or not there is a timed-out NAV or ONAV among the set NAV and ONAVs (step S819). For example, the NAV and ONAV management unit 212 can extract the timed-out ONAV on the basis of the reception time 504 and the Duration 505 illustrated in a of FIG. 6 (step S819). Furthermore, the NAV and ONAV management unit 212 can determine whether or not the NAV is timed out on the basis of, for example, the reception time 511 and the Duration 512 illustrated in b of FIG. 6 (step S819).

If there is a timed-out NAV or ONAV among the set NAV and ONAVs (step S819), the NAV and ONAV management unit 212 cancels the timed-out NAV or ONAV (step S820).

In addition, the apparatus repeats the series of operations (steps S801 to S821) after the end of the CF region in the BSS of the apparatus, until there is an instruction for ending the communication in the contention region for a predetermined time period (step S821), for example. Note that steps S801 to S820 are an example of a control procedure described in the claims.

In this way, the NAV and ONAV management unit 212 can manage, for each OBSS, the ONAV (transmission suppression time period) set in the OBSS that transmits a radio wave reaching at least the apparatus, along with the NAV (transmission suppression time period) set in the BSS. In this case, the NAV and ONAV management unit 212 can set the NAV for each OBSS on the basis of a control signal received from another information processing apparatus belonging to the OBSS. For example, the NAV and ONAV management unit 212 can set the ONAV of the OBSS on the basis of the value of the Duration in the control signal received from another information processing apparatus belonging to the OBSS.

The NAV and ONAV management unit 212 can also change the details of management of the ONAV on the basis of the type of the control signal received from another information processing apparatus belonging to the OBSS.

The information processing apparatus (AP1) 100 can also transmit data from the apparatus in a case where neither the NAV nor the ONAV is set. That is, the access control unit 206 can transmit data from the apparatus in a case where there is no registration in the ONAV information management table illustrated in a of FIG. 6 and there is no registration in the NAV information management table illustrated in b of FIG. 6. On the other hand, the access control unit 206 performs control not to transmit a signal to the wireless transmission path until all the registration in the ONAV information management table illustrated in a of FIG. 6 and the registration in the NAV information management table illustrated in b of FIG. 6 are cancelled.

In this way, according to the embodiment of the present technique, the ONAVs of individual OBSSs can be set and managed for each OBSS on the basis of control signals from the plurality of OBSSs existing around the BSS including the apparatus. As a result, the situation of the ONAV set for each OBSS can be figured out. Furthermore, in a case where a signal for cancelling an ONAV of an OBSS is received, only the ONAV of the OBSS that has transmitted the signal can be cancelled, and the other ONAVs of the OBSS can be maintained and figured out. That is, the other ONAVs can be maintained even in the case where one ONAV is cancelled, and the virtual carrier sense from different OBSSs can be surely carried out. This can realize an operation that avoids a collision with communication of surrounding OBSSs. In other words, a mechanism for preventing an unintended collision of frames in advance can be provided.

In addition, the number of ONAVs of OBSSs to be managed can be controlled according to the capacity of the information processing apparatus. That is, instead of managing the ONAVs of OBSSs without a limitation, only two or more longest ONAVs may be managed according to the capacity of the information processing apparatus. As a result, communication control for more surely avoiding a collision with communication of OBSSs can be realized in a more advanced device.

In addition, the ONAVs of the OBSSs can be recorded according to the formats of the frames. As a result, essentially necessary ONAVs for the OBSSs can be appropriately managed.

In addition, the individual NAVs (ONAVs) that are once set are not cancelled unless a CF-END frame is received from the information processing apparatus that has set the NAV (ONAV). As a result, the control for preventing a collision with signal reception of OBSSs can be appropriately performed.

In addition, in a case where a CTS frame is received from an information processing apparatus (AP) of the BSS including the apparatus, it can be determined that the CF region is started when the CTS frame is a CTS-to-self frame. This allows to figure out that the data is to be transmitted to the apparatus after the reception of the CTS frame.

In addition, in a case where a CF-END frame is received from an information processing apparatus (AP) of the BSS including the apparatus, it can be determined that the CF region is finished. This allows to figure out that the data is not to be transmitted to the apparatus after the reception of the CF-END frame.

In addition, for an RTS frame from an information processing apparatus (STA) other than the information processing apparatus (AP) included in the OBSS, provisional setting can be performed instead of setting the ONAV of the OBSS. In this case, the ONAV is set on a condition that the CTS frame is received from the information processing apparatus (AP) included in the OBSS. That is, the ONAV from the information processing apparatus (AP) included in the OBSS is validated, and the ONAV can be managed on the basis of the type of frame. This can increase transmission opportunities without affecting other devices.

Note that the system configuration as a target of the embodiment of the present technique is not limited to these. For example, although FIG. 1 illustrates an example of a communication system including three BSSs (nine devices), the number of BSSs and the number of devices are not limited to these. In addition, the connection mode of a plurality of devices is not limited to the connection modes described above. For example, the embodiment of the present technique can also be applied to a network connecting a plurality of devices based on a connection mode other than the connection modes described above.

Note that in the example illustrated in the embodiment of the present technique, the communication system includes an access point (master station) and subordinate apparatuses (slave stations) of the access point. However, the embodiment of the present technique may be applied to, for example, a network in which a plurality of devices wirelessly communicate one-to-one, and the plurality of devices are connected to each other (for example, mesh network or ad hoc network). For example, the embodiment of the present technique can be applied to a mesh network of IEEE 802.11s.

For example, in the case where the embodiment of the present technique is applied to the mesh network, the NAV in the BSS including the apparatus is not managed. Then, whether the series of setting and cancelling the NAV are necessary can be determined in response to reception of a control frame, such as an RTS frame and a CTS frame, transmitted from a device around the apparatus.

The embodiment of the present technique can also be applied to wireless communication between in-vehicle devices (for example, vehicle-to-vehicle communication or road-to-vehicle communication (V2X (vehicle to X))). In this case, whether the NAVs of the surrounding in-vehicle devices need to be set and cancelled can be determined according to the type of frames in a case where the in-vehicle devices around the apparatus receive control frames of each other.

In addition, in the case where the embodiment of the present technique is applied to these wireless communications, information of the distance measured between another device and the apparatus or the like may also be managed in addition to the information of the received field strength, for example.

In addition, the information processing apparatuses (AP, STA) according to the embodiment of the present technique can be applied to devices used in each field. For example, the information processing apparatuses can be applied to wireless devices used in cars (for example, car navigation apparatuses and smartphones). The information processing apparatuses can also be applied to, for example, the vehicle-to-vehicle communication or the road-to-vehicle communication (V2X) as described above. The information processing apparatuses can also be applied to, for example, learning devices used in the educational field (for example, tablet terminals). The information processing apparatuses can also be applied to, for example, wireless devices used in the agricultural field (for example, terminals of cattle management system). Similarly, the information processing apparatuses can be applied to, for example, wireless devices used in the sports field, the medical field, and the like.

2. Application Example

The technique according to the present disclosure can be applied to various products. For example, the information processing apparatus (AP, STA) may be realized as a mobile terminal, such as a smartphone, a tablet PC (Personal Computer), a notebook PC, a mobile game terminal, and a digital camera, a fixed terminal, such as a television receiver, a printer, a digital scanner, and a network storage, or an in-vehicle terminal, such as a car navigation apparatus. The information processing apparatus (AP, STA) may also be realized as a terminal (also called MTC (Machine Type Communication) terminal) that performs M2M (Machine To Machine) communication, such as a smart meter, a vending machine, a remote monitoring apparatus, and a POS (Point Of Sale) terminal. The information processing apparatus (AP, STA) may also be a wireless communication module mounted on these terminals (for example, integrated circuit module including one die).

On the other hand, the information processing apparatus (AP) may be realized as, for example, a wireless LAN access point (also called wireless base station) with a router function or without a router function. The information processing apparatus (AP) may also be realized as a mobile wireless LAN router. The information processing apparatus (AP) may also be a wireless communication module mounted on these apparatuses (for example, integrated circuit module including one die).

2-1. First Application Example

Figure 9:
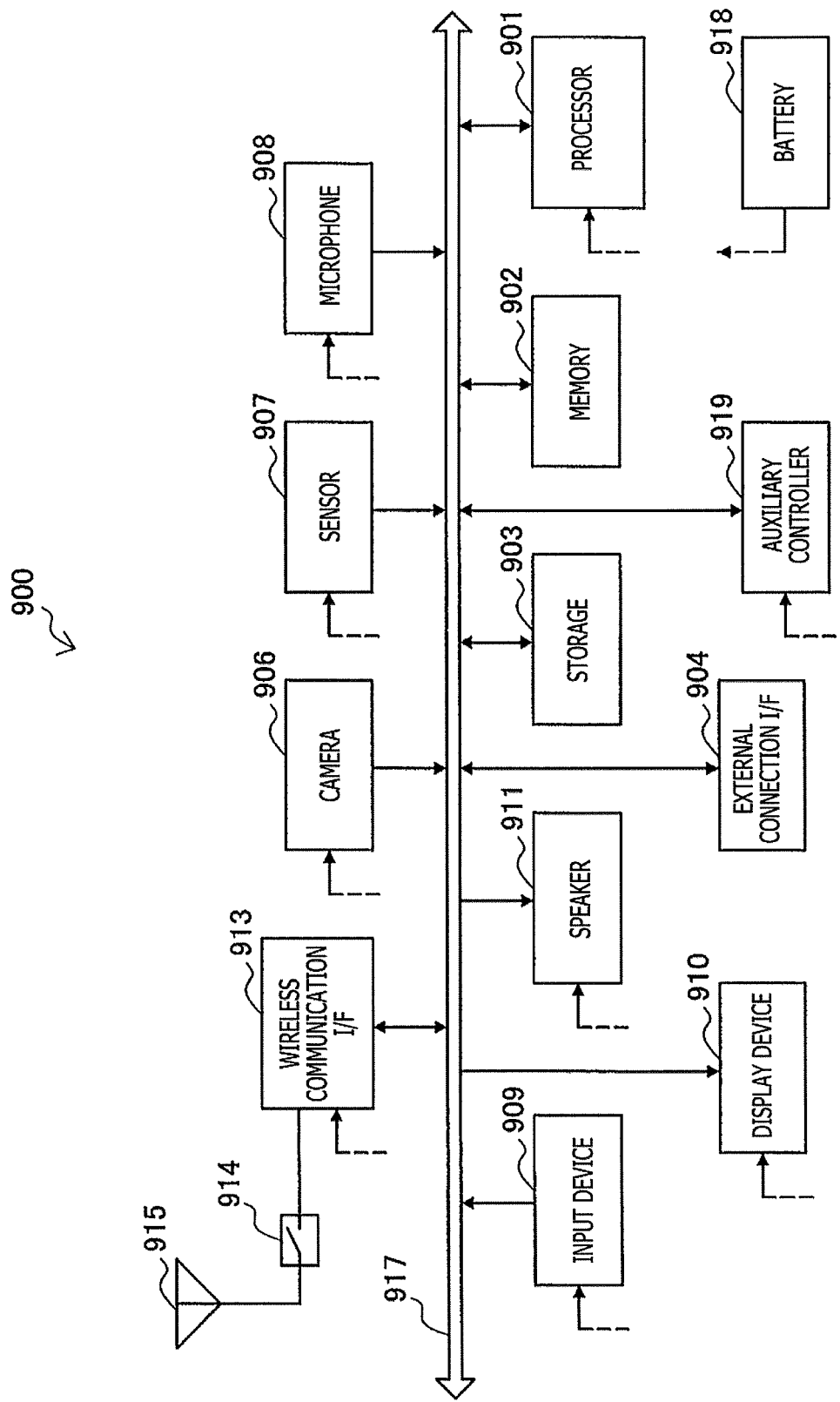
FIG. 9 is a block diagram illustrating an example of a schematic configuration of a smartphone.

FIG. 9 is a block diagram illustrating an example of a schematic configuration of a smartphone 900 to which the technique according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and the processor 901 controls functions of an application layer and other layers of the smartphone 900. The memory 902 includes a RAM (Random Access Memory) and a ROM (Read Only Memory) and stores programs and data executed by the processor 901. The storage 903 can include a storage medium, such as a semiconductor memory and a hard disk. The external connection interface 904 is an interface for connecting an external device, such as a memory card and a USB (Universal Serial Bus) device, to the smartphone 900.

The camera 906 includes, for example, an imaging element, such as a CCD (Charge Coupled Device) and a CMOS (Complementary Metal Oxide Semiconductor), and generates a captured image. The sensor 907 can include, for example, a sensor group, such as a positioning sensor, a gyrosensor, a geomagnetic sensor, and an acceleration sensor. The microphone 908 converts sound input to the smartphone 900 into a sound signal. The input device 909 includes, for example, a touch sensor that detects a touch on a screen of the display device 910, a key pad, a keyboard, a button, a switch, or the like and receives an operation or an input of information from the user. The display device 910 includes a screen, such as a liquid crystal display (LCD) and an organic light-emitting diode (OLED) display, and displays an output image of the smartphone 900. The speaker 911 converts a sound signal output from the smartphone 900 into sound.

The wireless communication interface 913 supports one or more wireless LAN standards, such as IEEE 802.11a, 11b, 11g, 11n, 11ac, and 11ad, and executes wireless communication. The wireless communication interface 913 can communicate with another apparatus through a wireless LAN access point in an infrastructure mode. Furthermore, the wireless communication interface 913 can directly communicate with another apparatus in a direct communication mode, such as an ad hoc mode and Wi-Fi Direct. Note that although one of two terminals operates as an access point in the Wi-Fi Direct unlike in the ad hoc mode, the terminals directly communicate with each other. The wireless communication interface 913 can typically include a baseband processor, an RF (Radio Frequency) circuit, a power amplifier, and the like. The wireless communication interface 913 may be a one-chip module integrating a memory that stores a communication control program, a processor that executes the program, and related circuits. The wireless communication interface 913 may support other types of wireless communication systems, such as a short-range wireless communication system, a near-field wireless communication system, and a cellular communication system, in addition to the wireless LAN system. The antenna switch 914 switches destinations of the antenna 915 between a plurality of circuits (for example, circuits for different wireless communication systems) included in the wireless communication interface 913. The antenna 915 includes a single or a plurality of antenna elements (for example, a plurality of antenna elements included in a MIMO antenna), and the antenna 915 is used for transmission and reception of radio signals through the wireless communication interface 913.

Note that the smartphone 900 is not limited to the example of FIG. 9, and the smartphone 900 may include a plurality of antennas (for example, an antenna for wireless LAN, an antenna for near-field wireless communication system, and the like). In that case, the antenna switch 914 may be excluded from the configuration of the smartphone 900.

The bus 917 mutually connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919. The battery 918 supplies power to each block of the smartphone 900 illustrated in FIG. 9 through power feed lines partially indicated by dotted lines in the figure. The auxiliary controller 919 causes the smartphone 900 to operate minimum required functions in a sleep mode, for example.

In the smartphone 900 illustrated in FIG. 9, the NAV and ONAV management unit 212 described with reference to FIG. 2 may be implemented in the wireless communication interface 913. In addition, at least some of the functions may be implemented in the processor 901 or the auxiliary controller 919. For example, the NAV and ONAV management unit 212 can manage the ONAV of each OBSS to perform appropriate wireless communication and reduce the power consumption of the battery 918.

Note that the processor 901 may execute an access point function in an application level, and the smartphone 900 may operate as a wireless access point (software AP). In addition, the wireless communication interface 913 may have a wireless access point function.

2-2. Second Application Example

Figure 10:
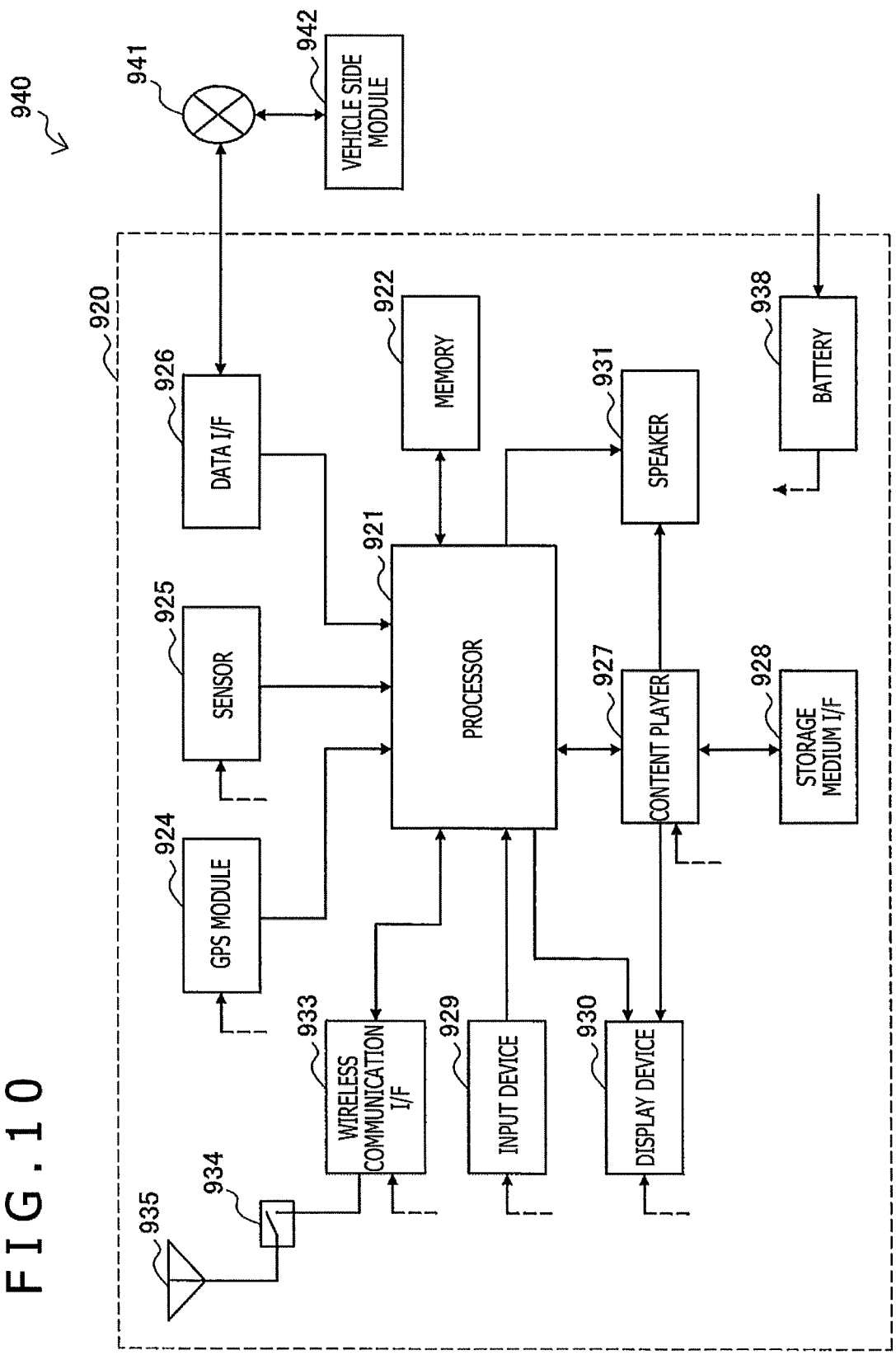
FIG. 10 is a block diagram illustrating an example of a schematic configuration of a car navigation apparatus.

FIG. 10 is a block diagram illustrating an example of a schematic configuration of a car navigation apparatus 920 to which the technique according to the present disclosure can be applied. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC, and the processor 921 controls a navigation function and other functions of the car navigation apparatus 920. The memory 922 includes a RAM and a ROM and stores programs and data executed by the processor 921.

The GPS module 924 uses a GPS signal received from a GPS satellite to measure the position (for example, latitude, longitude, and altitude) of the car navigation apparatus 920. The sensor 925 can include, for example, a sensor group, such as a gyrosensor, a geomagnetic sensor, and a pressure sensor. The data interface 926 is connected to an in-vehicle network 941 through, for example, a terminal not illustrated, and the data interface 926 acquires data, such as vehicle speed data, generated on the vehicle side.

The content player 927 reproduces content stored in a storage medium (for example, a CD or a DVD) inserted to the storage medium interface 928. The input device 929 includes, for example, a touch sensor that detects a touch on a screen of the display device 930, a button, a switch, or the like and receives an operation or an input of information from the user. The display device 930 includes a screen, such as an LCD and an OLED display, and displays an image of the navigation function or the content to be reproduced. The speaker 931 outputs sound of the navigation function or the content to be reproduced.

The wireless communication interface 933 supports one or more wireless LAN standards, such as IEEE 802.11a, 11b, 11g, 11n, 11ac, and 11ad, and executes wireless communication. The wireless communication interface 933 can communicate with another apparatus through a wireless LAN access point in an infrastructure mode. In addition, the wireless communication interface 933 can directly communicate with another apparatus in a direct communication mode, such as an ad hoc mode and Wi-Fi Direct. The wireless communication interface 933 can typically include a baseband processor, an RF circuit, a power amplifier, and the like. The wireless communication interface 933 may be a one-chip module integrating a memory that stores a communication control program, a processor that executes the program, and related circuits. The wireless communication interface 933 may support other types of wireless communication systems, such as a short-range wireless communication system, a near-field wireless communication system, and a cellular communication system, in addition to the wireless LAN system. The antenna switch 934 switches destinations of the antenna 935 between a plurality of circuits included in the wireless communication interface 933. The antenna 935 includes a single or a plurality of antenna elements, and the antenna 935 is used for transmission and reception of radio signals through the wireless communication interface 933.

Note that the car navigation apparatus 920 is not limited to the example of FIG. 10, and the car navigation apparatus 920 may include a plurality of antennas. In that case, the antenna switch 934 may be excluded from the configuration of the car navigation apparatus 920.

The battery 938 supplies power to each block of the car navigation apparatus 920 illustrated in FIG. 10 through power feed lines partially indicated by dotted lines in the figure. The battery 938 also accumulates power fed from the vehicle side.

In the car navigation apparatus 920 illustrated in FIG. 10, the NAV and ONAV management unit 212 described with reference to FIG. 2 may be implemented in the wireless communication interface 933. In addition, at least some of the functions may be implemented in the processor 921. For example, the NAV and ONAV management unit 212 can manage the ONAV of each OBSS to appropriately perform wireless communication.

In addition, the wireless communication interface 933 may operate as the information processing apparatus (AP) described above to provide wireless connection to the terminal possessed by the user riding on the vehicle.

In addition, the technique according to the present disclosure may be realized as an in-vehicle system (or vehicle) 940 including one or more blocks of the car navigation apparatus 920 described above, the in-vehicle network 941, and a vehicle side module 942. The vehicle side module 942 generates vehicle side data, such as vehicle speed, engine speed, and malfunction information, and outputs the generated data to the in-vehicle network 941.

2-3. Third Application Example

Figure 11:
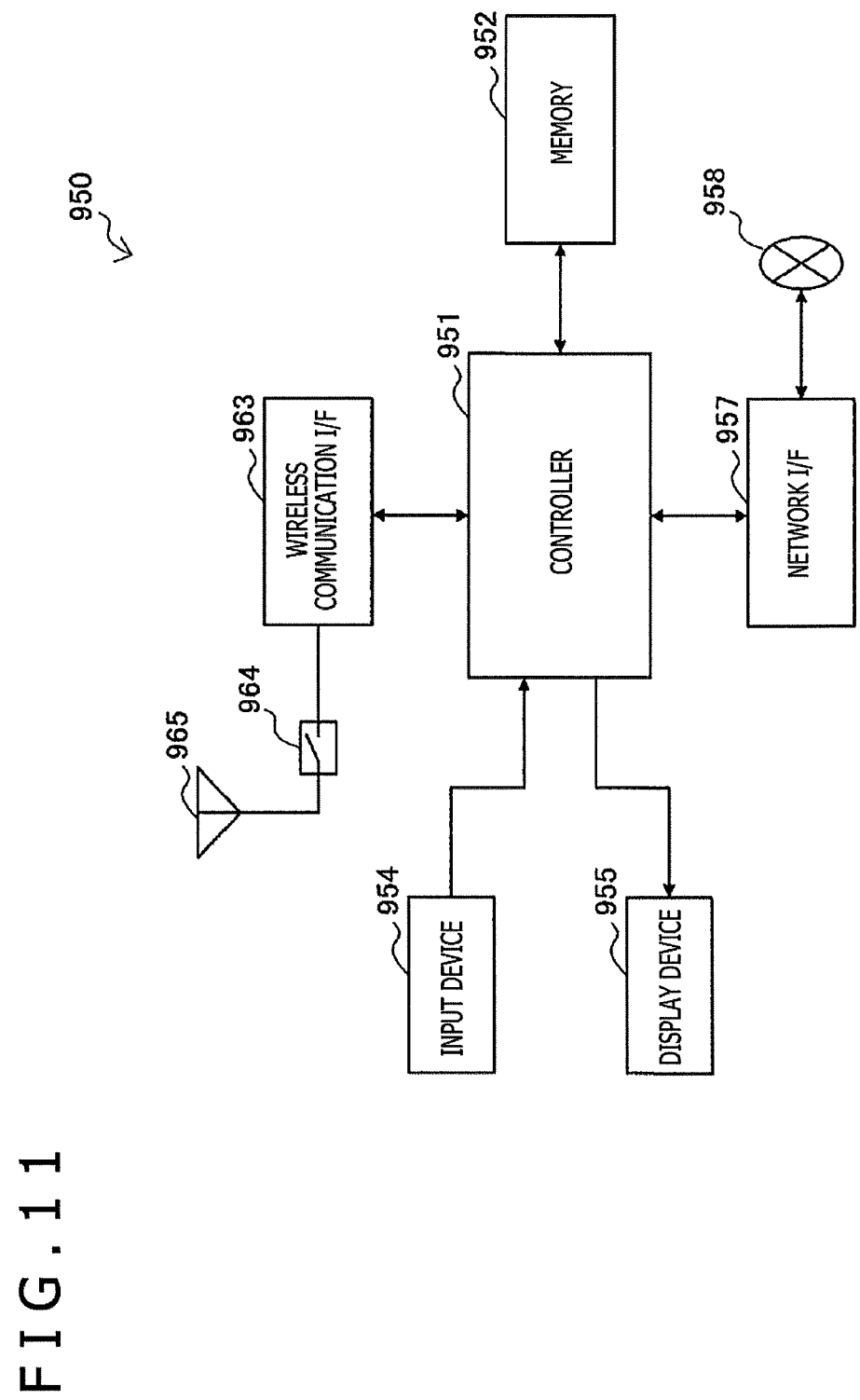
FIG. 11 is a block diagram illustrating an example of a schematic configuration of a wireless access point.

FIG. 11 is a block diagram illustrating an example of a schematic configuration of a wireless access point 950 to which the technique according to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a DSP (Digital Signal Processor), and the controller 951 operates various functions (for example, access restriction, routing, encryption, firewall, log management, and the like) of layers higher than an IP (Internet Protocol) layer of the wireless access point 950. The memory 952 includes a RAM and a ROM and stores programs executed by the controller 951 and various control data (for example, terminal list, routing table, encryption key, security setting, log, and the like).

The input device 954 includes, for example, a button, a switch, or the like and receives an operation from the user. The display device 955 includes an LED lamp or the like and displays the operation status of the wireless access point 950.

The network interface 957 is a wired communication interface for connection of the wireless access point 950 to a wired communication network 958. The network interface 957 may include a plurality of connection terminals. The wired communication network 958 may be a LAN, such as Ethernet (registered trademark), or may be a WAN (Wide Area Network).

The wireless communication interface 963 supports one or more wireless LAN standards, such as IEEE 802.11a, 11b, 11g, 11n, 11ac, and 11ad, and serves as an access point to provide wireless connection to neighboring terminals. The wireless communication interface 963 can typically include a baseband processor, an RF circuit, a power amplifier, and the like. The wireless communication interface 963 may be a one-chip module integrating a memory that stores a communication control program, a processor that executes the program, and related circuits. The antenna switch 964 switches destinations of the antenna 965 between a plurality of circuits included in the wireless communication interface 963. The antenna 965 includes a single or a plurality of antenna elements, and the antenna 965 is used for transmission and reception of radio signals through the wireless communication interface 963.

In the wireless access point 950 illustrated in FIG. 11, the NAV and ONAV management unit 212 described with reference to FIG. 2 may be implemented in the wireless communication interface 963. In addition, at least some of the functions may be implemented in the controller 951. For example, the NAV and ONAV management unit 212 can manage the ONAV of each OBSS to perform appropriate wireless communication.

Note that the above-described embodiment illustrates an example for embodying the present technique, and the matters in the embodiment and the matters used to specify the invention in the claims correspond to each other. Similarly, the matters used to specify the invention in the claims and the matters with the same names in the embodiment of the present technique correspond to each other. However, the present technique is not limited to the embodiment, and the present technique can be embodied by applying various modifications to the embodiment without departing from the scope of the present technique.

In addition, the processing procedures described in the embodiment may be regarded as a method including the series of procedures, and the processing procedures may be regarded as a program for causing a computer to execute the series of procedures or as a recording medium storing the program. Examples of the recording medium that can be used include a CD (Compact Disc), an MD (MiniDisc), a DVD (Digital Versatile Disc), a memory card, and a Blu-ray (registered trademark) Disc.

Note that the advantageous effects described in the present specification are illustrative only, and the advantageous effects are not limited. There may also be other advantageous effects.

Note that the present technique can also be configured as follows.

(1)

An information processing apparatus including:

a management unit that manages a transmission suppression time period set in a network including the information processing apparatus and that manages a transmission suppression time period set in each of other networks, the other networks not including the information processing apparatus and transmitting radio waves reaching at least the information processing apparatus, the management unit managing the transmission suppression time period for each of the other networks.

(2)

The information processing apparatus according to (1), in which the management unit sets the transmission suppression time period of each of the other networks on a basis of a control signal received from another information processing apparatus belonging to one of the other networks.

(3)

The information processing apparatus according to (1), in which the management unit sets the transmission suppression time period of one of the other networks on a basis of a value of Duration in a control signal received from another information processing apparatus belonging to the one of the other networks.

(4)

The information processing apparatus according to (1), in which in a case where a control signal received from another information processing apparatus belonging to one of the other networks is a CTS (Clear to Send) frame, the management unit sets the transmission suppression time period of the one of the other networks as a management target.

(5)

The information processing apparatus according to (1), in which in a case where a control signal received from another information processing apparatus belonging to one of the other networks is a CF-END (Contention Free End) frame, the management unit cancels the transmission suppression time period of the one of the other networks corresponding to address information in the CF-END frame.

(6)

The information processing apparatus according to (1), in which in a case where a control signal received from another information processing apparatus belonging to the network is an RTS (Request to Send) frame, the management unit sets the transmission suppression time period of the network on a basis of a value of Duration in the RTS frame.

(7)

The information processing apparatus according to any one of (1) to (6), further including:

an access control unit that performs control not to transmit a signal to a wireless transmission path until all the transmission suppression time period of the network and the transmission suppression time period of each of the other networks as management targets of the management unit are cancelled.

(8)

The information processing apparatus according to any one of (1) to (7), in which the management unit changes details of management of the transmission suppression time period on a basis of a type of control signal received from another information processing apparatus belonging to one of the other networks.

(9)

The information processing apparatus according to any one of (1) to (8), in which the management unit manages, for each of the other networks, transmission suppression time periods set in a plurality of the other networks.

(10)

The information processing apparatus according to any one of (1) to (9), in which in a case where a control signal received from an access point belonging to the network is a CTS frame, the management unit figures out that data is to be transmitted in the network.

(11)

The information processing apparatus according to any one of (1) to (10), in which in a case where a control signal received from an access point belonging to the network is a CF-END frame, the management unit figures out that data is not to be transmitted from the access point in the network.

(12)

A communication system including:

a first information processing apparatus that transmits a control signal for setting a transmission suppression time period in a network including both the first information processing apparatus and a second information processing apparatus in a case where data is to be transmitted in the network; and the second information processing apparatus that includes a management unit that manages the transmission suppression time period set in the network on a basis of the control signal and that manages a transmission suppression time period set in each of other networks, the other networks not including the first information processing apparatus or the second information processing apparatus and transmitting radio waves reaching at least the second information processing apparatus, the management unit managing the transmission suppression time period for each of the other networks.

(13)

An information processing method of managing a transmission suppression time period set in a network including an information processing apparatus and of managing a transmission suppression time period set in each of other networks, the other networks not including the information processing apparatus and transmitting radio waves reaching at least the information processing apparatus, the information processing method managing the transmission suppression time period for each of the other networks.

(14)

A program causing a computer to execute a control procedure of managing a transmission suppression time period set in a network including an information processing apparatus and of managing a transmission suppression time period set in each of other networks, the other networks not including the information processing apparatus and transmitting radio waves reaching at least the information processing apparatus, the control procedure managing the transmission suppression time period for each of the other networks.

REFERENCE SIGNS LIST

10 Communication system
21 Internet communication unit
22 Information input unit
23 Device control unit
24 Information output unit
100 Information processing apparatus (AP1)
101 Information processing apparatus (STA1-1)
102 Information processing apparatus (STA1-2)
110 Information processing apparatus (AP2)
111 Information processing apparatus (STA2-1)
112 Information processing apparatus (STA2-2)
120 Information processing apparatus (AP3)
121 Information processing apparatus (STA3-1)
122 Information processing apparatus (STA3-2)
201 Interface unit
202 Transmission buffer
203 Data frame generation unit
204 Control frame generation unit
205 Wireless signal transmission processing unit
206 Access control unit
207 Transmission power control/received field strength setting unit
208 Antenna control unit
209A, 209B Antenna element
210 Wireless signal reception processing unit
211 Control frame extraction unit
212 NAV and ONAV management unit
213 Data frame extraction unit
214 Reception buffer
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation apparatus
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 In-vehicle network
942 Vehicle side module
950 Wireless access point
951 Controller
952 Memory
954 Input device
955 Display device
957 Network interface
958 Wired communication network
963 Wireless communication interface
964 Antenna switch
965 Antenna

The invention claimed is:

1. An information processing apparatus comprising:
circuitry configured to:
manage a plurality of transmission suppression time periods each corresponding to one of a plurality of overlapping networks based on identification information of the plurality of overlapping networks, based on a management table, the management table including information of reception time on a basis of frames, in addition to a transmission suppression time period of a network including the information processing device, each of the plurality of overlapping networks including at least one other information processing apparatus; and
determine a number of target networks from the plurality of overlapping networks based on radio wave condition information in association with the overlapping networks, the target networks being set as a management target of transmission suppression for the information processing apparatus by the management table,
wherein the circuitry selects the determined number of the target networks from the plurality of overlapping networks, which has latest cancel timing of transmission suppression based on the reception time and the transmission suppression time period in the management table, sequentially, as the management target of transmission suppression for the information processing apparatus,
wherein, in a case where a control signal received from another information processing apparatus belonging to one of the plurality of overlapping networks is a CF-END (Contention Free End) frame, the circuitry cancels the transmission suppression time period of the one of the plurality of overlapping networks corresponding to address information in the CF-END frame.

2. The information processing apparatus according to claim 1, wherein the circuitry sets the transmission suppression time period of each of the plurality of overlapping networks on a basis of a control signal received from another information processing apparatus belonging to one of the plurality of overlapping networks.

3. The information processing apparatus according to claim 1, wherein
the circuitry sets the transmission suppression time period of one of the plurality of overlapping networks on a basis of a value of Duration in a control signal received from another information processing apparatus belonging to the one of the plurality of overlapping networks.

4. The information processing apparatus according to claim 1, wherein
in a case where a control signal received from another information processing apparatus belonging to one of the plurality of overlapping networks is a CTS (Clear to Send) frame, the circuitry sets the transmission suppression time period of the one of the plurality of overlapping networks as the management target.

5. The information processing apparatus according to claim 1, wherein
in a case where a control signal received from another information processing apparatus belonging to the plurality of overlapping networks is an RTS (Request to Send) frame, the circuitry sets the transmission suppression time period of the network on a basis of a value of Duration in the RTS frame.

6. The information processing apparatus according to claim 1, further comprising:
the circuitry performs control not to transmit a signal to a wireless transmission path until all the transmission suppression time period of the network and the transmission suppression time periods of each of the plurality of overlapping networks as the management targets are cancelled.

7. The information processing apparatus according to claim 1, wherein
the circuitry changes details of management of the transmission suppression time periods on a basis of a type of control signal received from another information processing apparatus belonging to one of the plurality of overlapping networks.

8. The information processing apparatus according to claim 1, wherein
the circuitry manages the transmission suppression time periods on a basis of Overlapping Basic Service Set (OBSS) as the plurality of the other networks.

9. The information processing apparatus according to claim 1, wherein
in a case where a control signal received from an access point belonging to the network is a CTS frame, the circuitry observes that data is to be transmitted in the network.

10. The information processing apparatus according to claim 1, wherein
in a case where a control signal received from an access point belonging to the network is a CF-END frame, the circuitry observes that data is not to be transmitted from the access point in the network.

11. The information processing apparatus according to claim 1, wherein the radio wave condition information is information of a reception signal strength of a frame which is transmitted from the other information processing apparatus included in the overlapping networks.

12. The information processing apparatus according to claim 11, wherein the radio wave condition information is at least one of Received Signal Strength Indicator (RSSI), Packet Error Rate (PER), Bit Error Rate (BER), a number of retransmissions of packet, throughput, drop frame, Signal to Interference Ratio (SIR), and Signal to Interference plus Noise Ratio (SINR).

13. The information processing apparatus according to claim 12, wherein the circuitry selects the target networks with high value of RSSI sequentially.

14. The information processing apparatus according to claim 1,
wherein the circuitry sets the transmission suppression time period of each of the plurality of overlapping networks and the reception time to the management table for managing Overlap Network Allocation Vector (ONAV),
wherein, in a case where the CF-END frame is transmitted from another information processing apparatus belonging to one of the plurality of overlapping networks, the circuitry cancels the ONAV corresponding to the overlapping network and executes a process of deletion the transmission suppression time period corresponding to the overlapping network from the management table, and
wherein, in a case where no frame corresponds to a RTS frame or a CTS frame, the circuitry ignores the CF-END frame as the CF-END frame is transmitted from another OBSS which is not registered in the management table, and does not execute the process of deletion from the management table.

15. A communication system comprising:
a first information processing apparatus that transmits a control signal for setting a transmission suppression time period in a network including both the first information processing apparatus and a second information processing apparatus in a case where data is to be transmitted in the network; and
the second information processing apparatus that manages the transmission suppression time period set in the network on a basis of the control signal, manages a plurality of transmission suppression time periods each corresponding to one of a plurality of overlapping networks based on identification information of the plurality of overlapping networks, based on a management table, the management table including information of reception time on a basis of frames, in addition to a transmission suppression time period, each of the plurality of overlapping networks including at least one other information processing apparatus, and determines a number of target networks from the plurality of overlapping networks based on radio wave condition information in association with the overlapping networks, the target networks being set as a management target of transmission suppression for the information processing apparatus by the management table,
wherein the second information processing apparatus selects the determined number of the target networks from the plurality of overlapping networks, which has latest cancel timing of transmission suppression based on the reception time and the transmission suppression time period in the management table, sequentially, as the management target of transmission suppression for the information processing apparatus,
wherein, in a case where a control signal received from another information processing apparatus belonging to one of the plurality of overlapping networks is a CF-END (Contention Free End) frame, the second information processing apparatus cancels the transmission suppression time period of the one of the plurality of overlapping networks corresponding to address information in the CF-END frame.

16. An information processing method comprising:
managing a plurality of transmission suppression time periods each corresponding to one of a plurality of overlapping networks based on identification information of the plurality of overlapping networks, based on a management table, the management table including information of reception time on a basis of frames, in addition to a transmission suppression time period of a network including the information processing device, each of the plurality of overlapping networks including at least one other information processing apparatus; and
determining a number of target networks from the plurality of overlapping networks based on radio wave condition information in association with the overlapping networks, the target networks being set as a management target of transmission suppression for the information processing apparatus by the management table,
wherein the determined number of the target networks are selected from the plurality of overlapping networks, which has latest cancel timing of transmission suppression based on the reception time and the transmission suppression time period in the management table, sequentially, as the management target of transmission suppression for the information processing apparatus,
wherein, in a case where a control signal received from another information processing apparatus belonging to one of the plurality of overlapping networks is a CF-END (Contention Free End) frame, the transmission suppression time period of the one of the plurality of overlapping networks corresponding to address information in the CF-END frame is canceled.

17. The information processing method according to claim 16, wherein the radio wave condition information is information of a reception signal strength of a frame which is transmitted from the other information processing apparatus included in the overlapping networks.

18. A non-transitory computer-readable storage medium including computer executable instructions, wherein the instructions, when executed by an information processing apparatus, cause the information processing apparatus to perform a method, the method comprising:
managing a plurality of transmission suppression time periods each corresponding to one of a plurality of overlapping networks based on identification information of the plurality of overlapping networks, based on a management table, the management table including information of reception time on a basis of frames, in addition to a transmission suppression time period of a network including the information processing device, each of the plurality of overlapping networks including at least one other information processing apparatus; and
determining a number of target networks from the plurality of overlapping networks based on radio wave condition information in association with the overlapping networks, the target networks being set as a management target of transmission suppression for the information processing apparatus by the management table,
wherein the determined number of the target networks are selected from the plurality of overlapping networks, which has latest cancel timing of transmission suppression based on the reception time and the transmission suppression time period in the management table, sequentially, as the management target of transmission suppression for the information processing apparatus,
wherein, in a case where a control signal received from another information processing apparatus belonging to one of the plurality of overlapping networks is a CF-END (Contention Free End) frame, the transmission suppression time period of the one of the plurality of overlapping networks corresponding to address information in the CF-END frame is canceled.

19. The non-transitory computer-readable storage medium according to claim 18, wherein the radio wave condition information is information of a reception signal strength of a frame which is transmitted from the other infouniation processing apparatus included in the overlapping networks.

20. The non-transitory computer-readable storage medium according to claim 18, wherein the method further comprising,
setting the transmission suppression time period of each of the plurality of overlapping networks and the reception time to the management table for managing Overlap Network Allocation Vector (ONAV),
wherein, in a case where the CF-END frame is transmitted from another information processing apparatus belonging to one of the plurality of overlapping networks, canceling the ONAV corresponding to the overlapping network and executing a process of deletion the transmission suppression time period corresponding to the overlapping network from the management table, and
wherein, in a case where no frame corresponds to a RTS frame or a CTS frame, ignoring the CF-END frame as the CF-END frame is transmitted from another OBSS which is not registered in the management table without executing the process of deletion from the management table.

* * * * *